US012649532B2

(12) United States Patent
Husain

(10) Patent No.: US 12,649,532 B2
(45) Date of Patent: Jun. 9, 2026

(54) PERSONAL MOBILITY DEVICE HAVING KINETIC POWERED LOAD COMPONENT

(71) Applicant: Jetson Electric Bike LLC, Brooklyn, NY (US)

(72) Inventor: Sam Husain, Brooklyn, NY (US)

(73) Assignee: JETSTREAM BRANDS LLC, New Castle, DE (US)

( * ) Notice: Subject to any disclaimer, the term of this patent is extended or adjusted under 35 U.S.C. 154(b) by 663 days.

(21) Appl. No.: 18/104,182

(22) Filed: Jan. 31, 2023

(65) Prior Publication Data

US 2024/0253720 A1      Aug. 1, 2024

(51) Int. Cl.
*B62J 6/01* (2020.01)
*B62J 43/30* (2020.01)
*B62K 3/00* (2006.01)
*H02K 7/18* (2006.01)

(52) U.S. Cl.
CPC ................. *B62J 6/01* (2020.02); *B62J 43/30* (2020.02); *B62K 3/002* (2013.01); *H02K 7/1861* (2013.01)

(58) Field of Classification Search
CPC .. B62J 6/01; B62J 43/30; B62K 3/002; H02K 7/1861

USPC ....................................................... 280/281.1
See application file for complete search history.

(56) References Cited

U.S. PATENT DOCUMENTS

| | | | | |
|---|---|---|---|---|
| 2002/0079855 A1* | 6/2002 | Parks | ..................... | B62K 3/002 318/560 |
| 2002/0088660 A1* | 7/2002 | Wong | ..................... | B62K 3/002 180/220 |
| 2003/0221888 A1* | 12/2003 | McKinney, Jr. | ....... | B62K 3/002 180/181 |
| 2021/0016850 A1* | 1/2021 | Bass | ........................ | B62M 6/70 |

FOREIGN PATENT DOCUMENTS

WO          WO-0115967 A1 *   3/2001   ............. B62M 6/45

* cited by examiner

*Primary Examiner* — Jacob D Knutson
(74) *Attorney, Agent, or Firm* — Meister Seelig & Schuster PLLC

(57) ABSTRACT

In an embodiment, a personal mobility device is disclosed. The personal mobility device includes a wheel, a support structure coupled to the wheel, a load component and a generator device coupled to the support structure. The generator device is configured to frictionally engage against the wheel such that a rotation of the wheel causes the generator device to generate electrical energy. The personal mobility device is configured to power the load component based at least in part on the generated electrical energy.

27 Claims, 22 Drawing Sheets

PERSONAL MOBILITY DEVICE HAVING KINETIC POWERED LOAD COMPONENT

COPYRIGHT NOTICE

BACKGROUND

This application relates to personal mobility devices, and in particular, to personal mobility devices that generate power during use.

Personal mobility devices are configured to convey a user from place to place. With the advent of electric personal mobility devices, many users desire powered functionality such as lighting, phone connectivity, speakers or other similar functions. Such features are often powered by a battery system associated with an electric motor that is configured to drive the wheels of the personal mobility device. However, the power supplied by a battery is limited and the battery may require significant time to recharge. In other cases, lighting or other functionality may be desired without requiring the use of a battery, e.g., on unpowered scooters, bicycles or other personal mobility devices. Providing such functionality in a manner that does not rely only on battery power may be a challenge.

SUMMARY

In an embodiment, a personal mobility device is disclosed. The personal mobility device comprises a wheel, a support structure coupled to the wheel, a load component and a generator device coupled to the support structure. The generator device is configured to frictionally engage against the wheel such that a rotation of the wheel causes the generator device to generate electrical energy. The personal mobility device is configured to power the load component based at least in part on the generated electrical energy.

In some embodiments, the generator device comprises a rotor and a stator and the rotor is configured to frictionally engage against the wheel such that the rotation of the wheel causes the rotor to rotate about the stator. The stator is configured to generate the electrical energy based at least in part on the rotation of the rotor.

In an embodiment, the load component comprises at least one lighting component.

In another embodiment, the personal mobility device comprises an electrical storage component electrically interposed between the generator device and the load component. The electrical storage component is configured to supply electrical energy to the load component and is configured to charge based at least in part on the electrical energy generated by the generator device.

In some embodiments, the personal mobility device comprises voltage regulation circuitry disposed between the generator device and the load component, the voltage regulation circuitry being configured to regulate at least one of a voltage and a current of the electrical energy generated by the generator device.

In another embodiment, the personal mobility device comprises an output connection that is configured to provide the electrical energy to an electrical device that is separate from the personal mobility device.

In an embodiment, the output connection comprises at least one of a port, plug and a socket.

In another embodiment, the output connection comprises a wireless power transmitter.

In some embodiments, the generator device is biased against the second wheel by a biasing component.

In an embodiment, the biasing component comprises a spring.

In another embodiment, the support structure comprises a support member and a housing. The housing defines a cavity therein that is configured to slidingly receive the generator device therein such that the biasing component engages against the housing to bias the generator device towards the second wheel.

In some embodiments, the support member comprises a second cavity that is configured to receive the housing therein.

In an embodiment, the second cavity comprises at least one channel and the housing comprises at least one flange. The at least one channel is configured to receive the at least one flange of the housing therein when the housing is received in the second cavity.

In another embodiment, the cavity comprises at least one channel and the generator device comprises at least one flange. The at least one channel is configured to slidingly receive the at least one flange of the generator device therein when the generator device is received in the cavity.

In some embodiments, the generator device is configured to linearly translate within the cavity along the at least one channel.

In an embodiment, a personal mobility device is disclosed. The personal mobility device comprises a first wheel, a second wheel, a support structure disposed between the first wheel and the second wheel, a load component and a generator device coupled to the support structure. The generator device is configured to frictionally engage against the second wheel such that a rotation of the second wheel causes the generator device to generate electrical energy. The personal mobility device is configured to power the load component based at least in part on the generated electrical energy.

In some embodiments, the support structure comprises a support member and platform coupled to a top surface of the support member. The platform is configured for standing on by a user of the personal mobility device and the generator device is coupled to the support member at least partially below the platform.

In another embodiment, the generator device is coupled to an end of the support member and is disposed between the support member and the second wheel.

In an embodiment, a scooter is disclosed. The scooter comprises a handlebar, a stem, a first wheel, a second wheel, a support structure coupled to the second wheel, a load component and a generator device coupled to the support structure. The generator device is configured to frictionally engage against the second wheel such that a rotation of the second wheel causes the generator device to generate electrical energy. The scooter is configured to power the load component based at least in part on the generated electrical energy.

In some embodiments, the generator device comprises a rotor and a stator and the rotor is configured to frictionally engage against the second wheel such that the rotation of the second wheel causes the rotor to rotate about the stator. The stator is configured to generate the electrical energy based at least in part on the rotation of the rotor.

The foregoing summary is illustrative only and is not intended to be in any way limiting. These and other illustrative embodiments include, without limitation, apparatus, systems, methods and computer-readable storage media. In addition to the illustrative aspects, embodiments, and features described above, further aspects, embodiments, and features will become apparent by reference to the drawings and the following detailed description.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the illustrative embodiments. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may for example, take the form of hardware, software, firmware or any combination thereof (other than software per se). The following detailed description is, therefore, not intended to be taken in a limiting sense.

Figure 1:
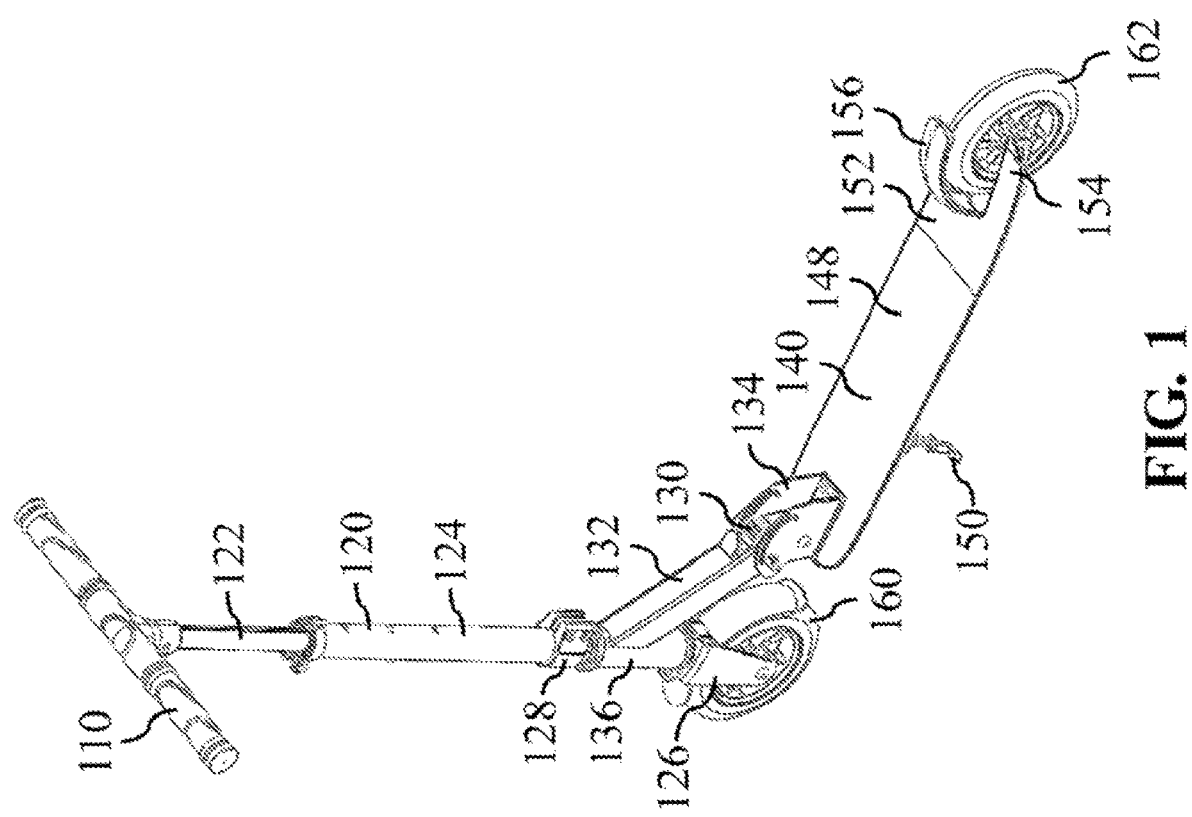
FIG. 1 is a perspective view of an example personal mobility device according to an embodiment.
Figure 2:
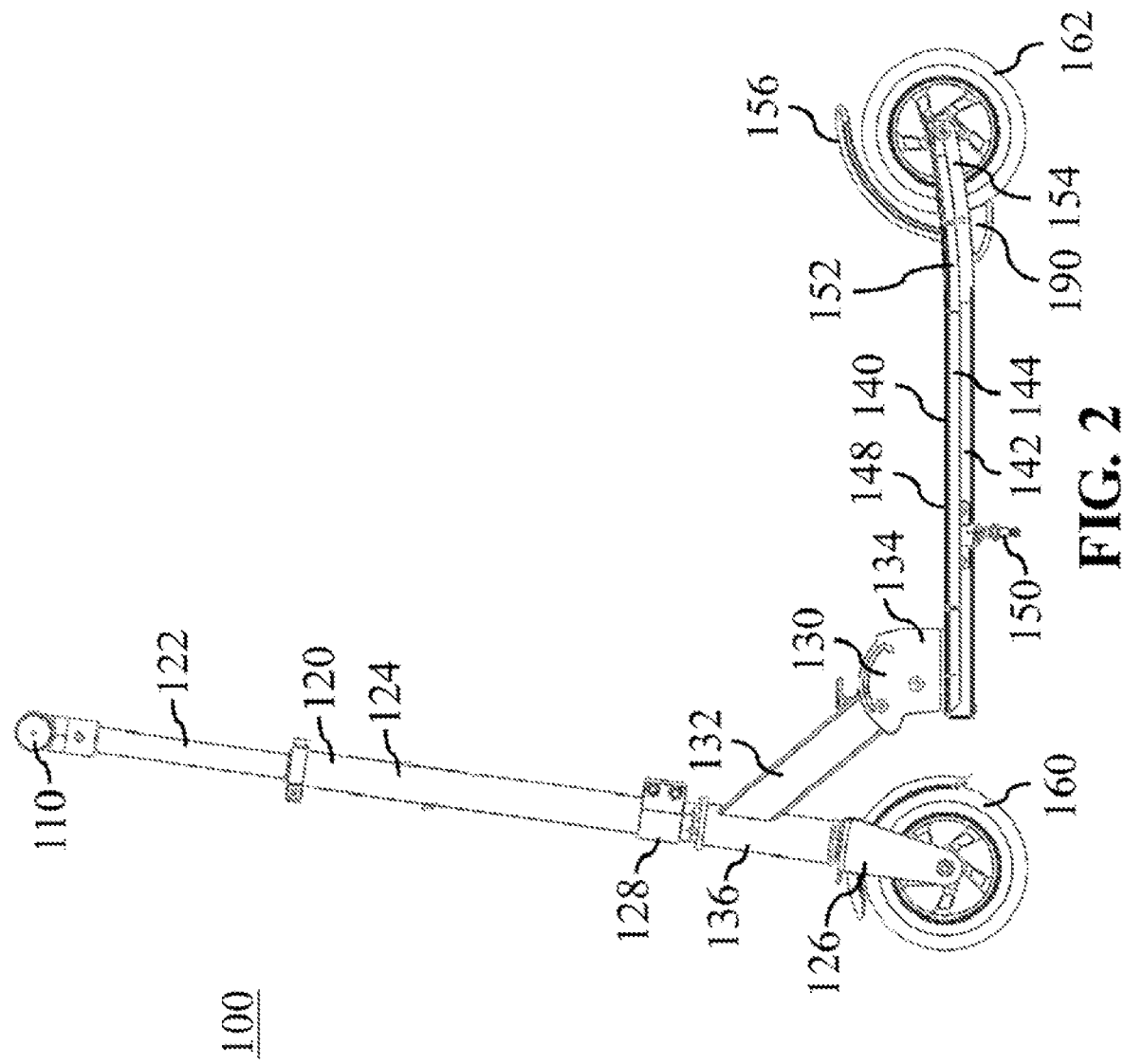
FIG. 2 is side view of the personal mobility device of FIG. 1 according to an embodiment.
Figure 3:
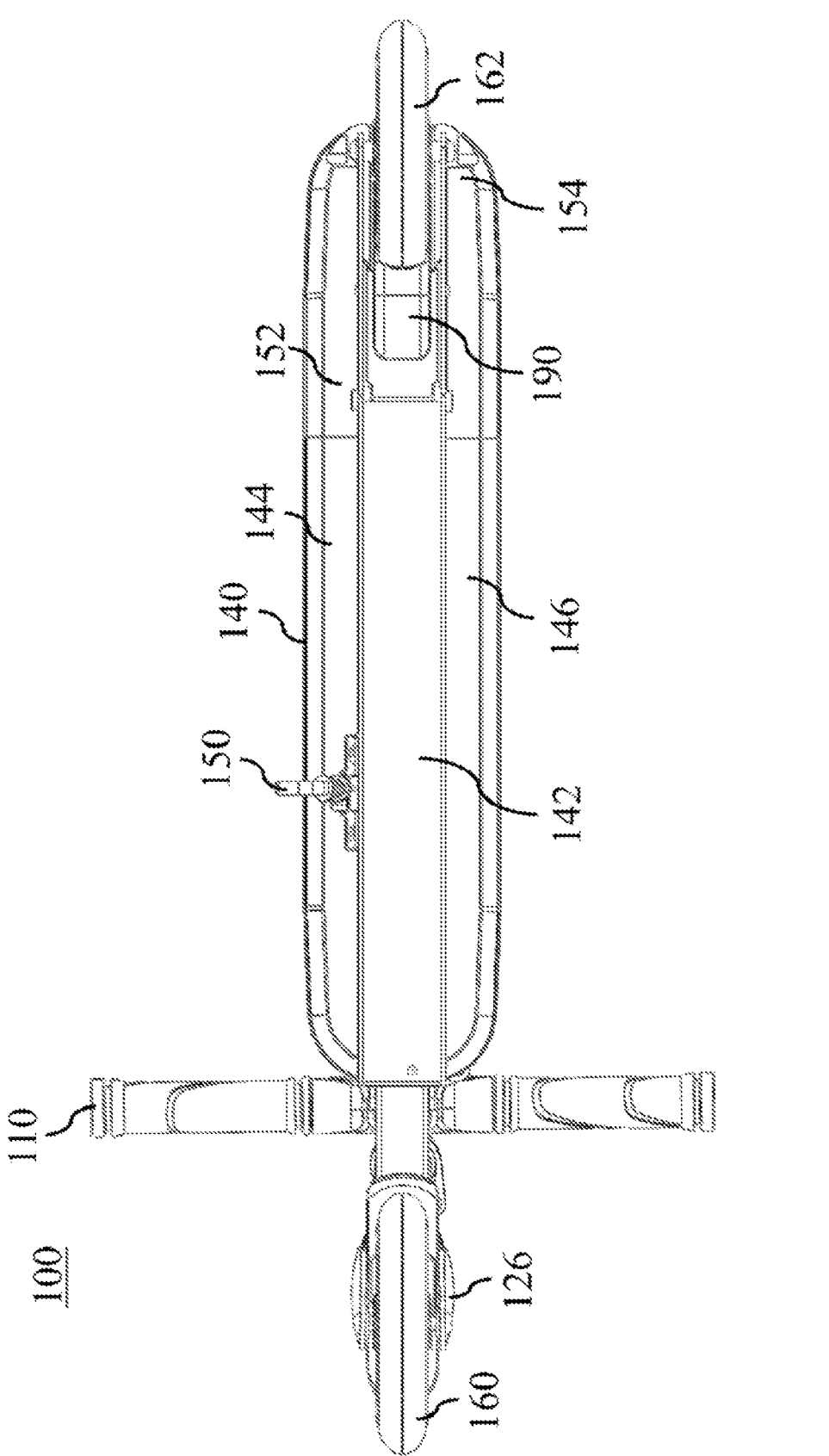
FIG. 3 is bottom-up view of the personal mobility device of FIG. 1 according to an embodiment.
Figure 4:
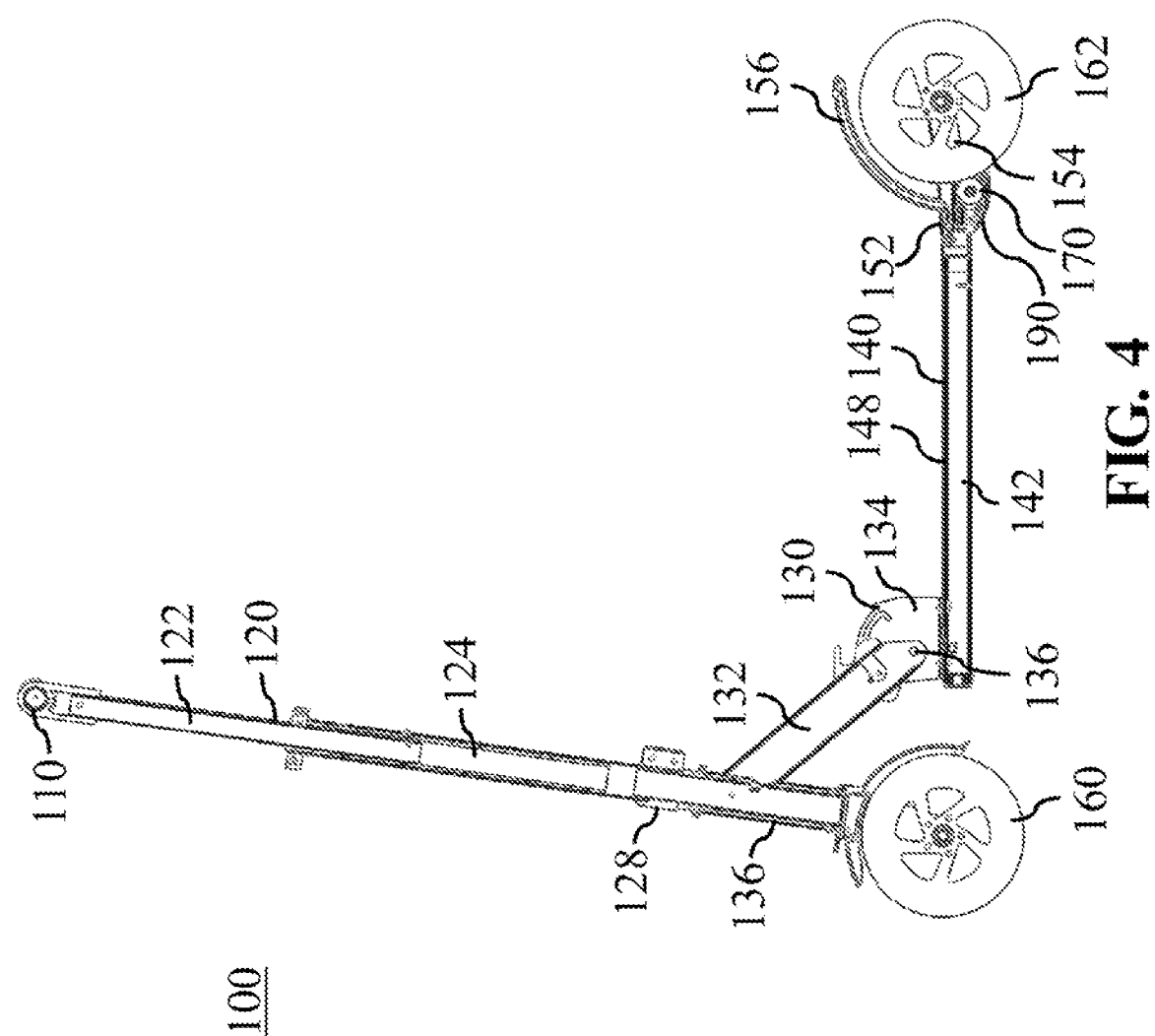
FIG. 4 is cross-sectional side view of the personal mobility device of FIG. 1 according to an embodiment.
Figure 5:
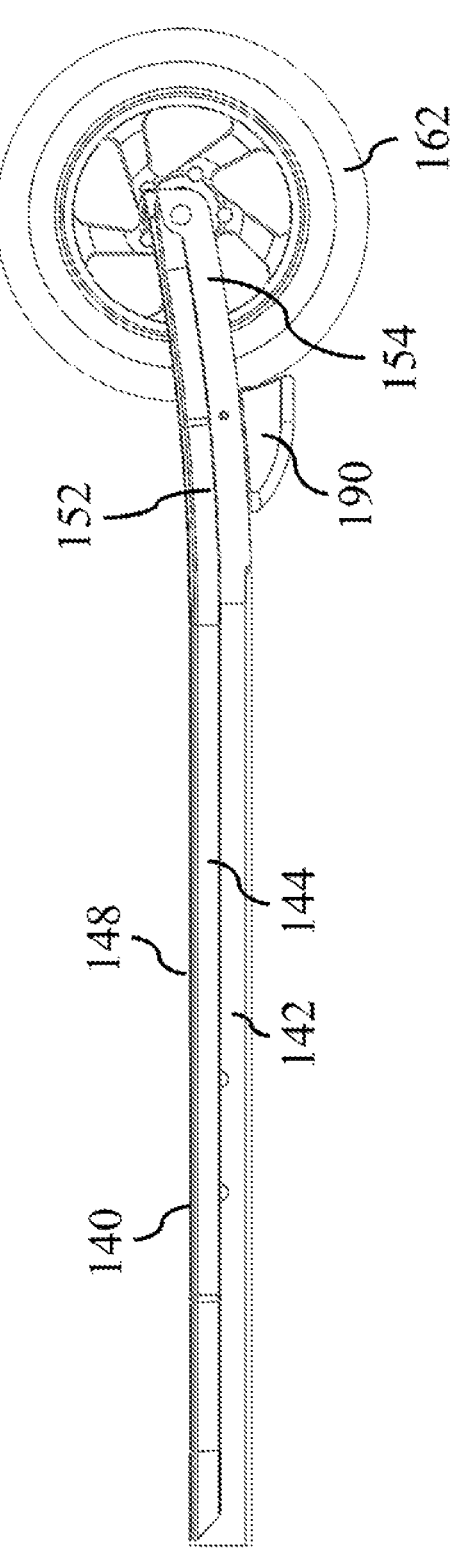
FIG. 5 is an expanded side view of a rear portion of the personal mobility device of FIG. 1 according to an embodiment.
Figure 6:
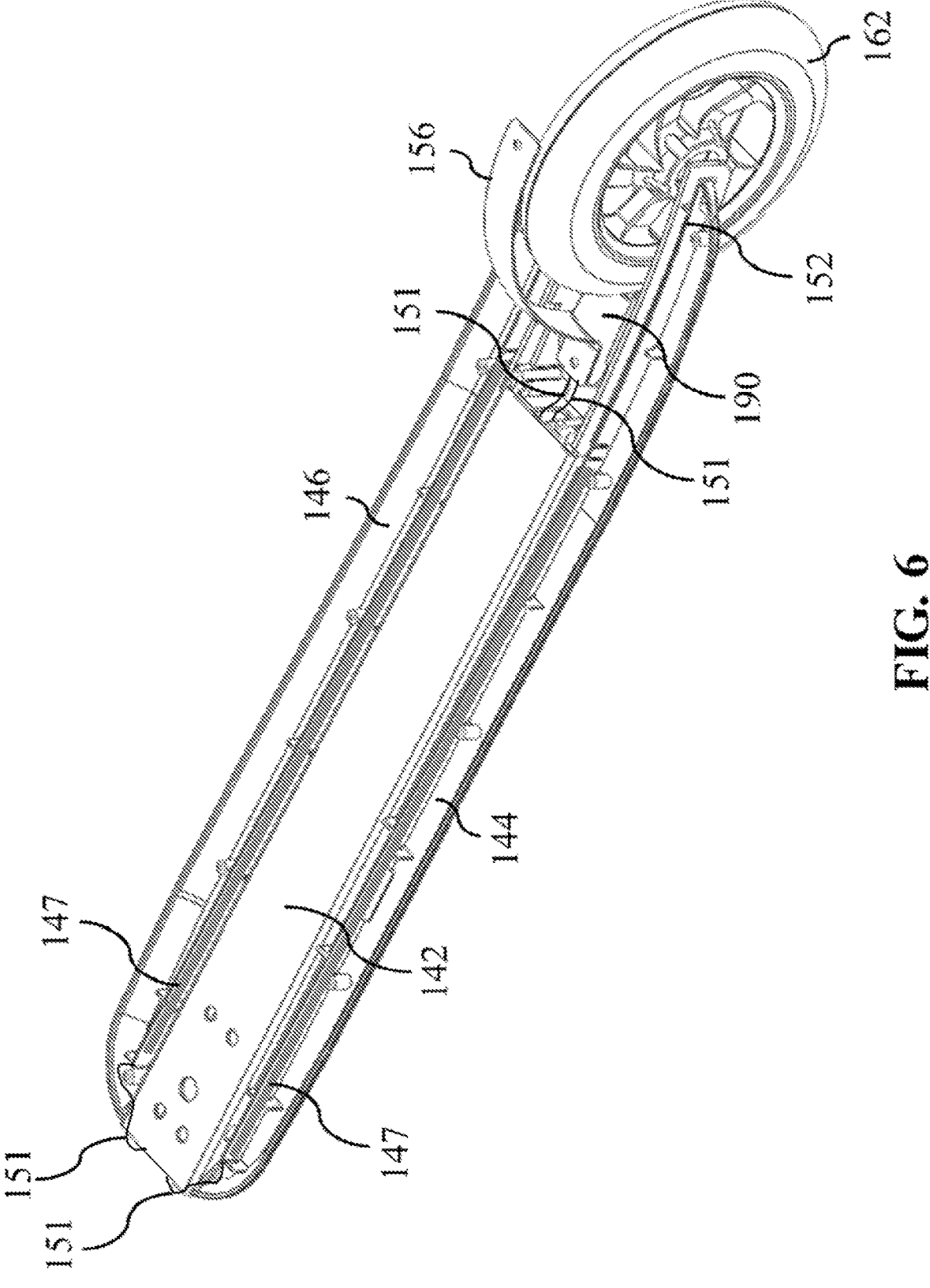
FIG. 6 is a perspective view of the rear portion of the personal mobility device of FIG. 1 with a platform removed according to an embodiment.
Figure 7:
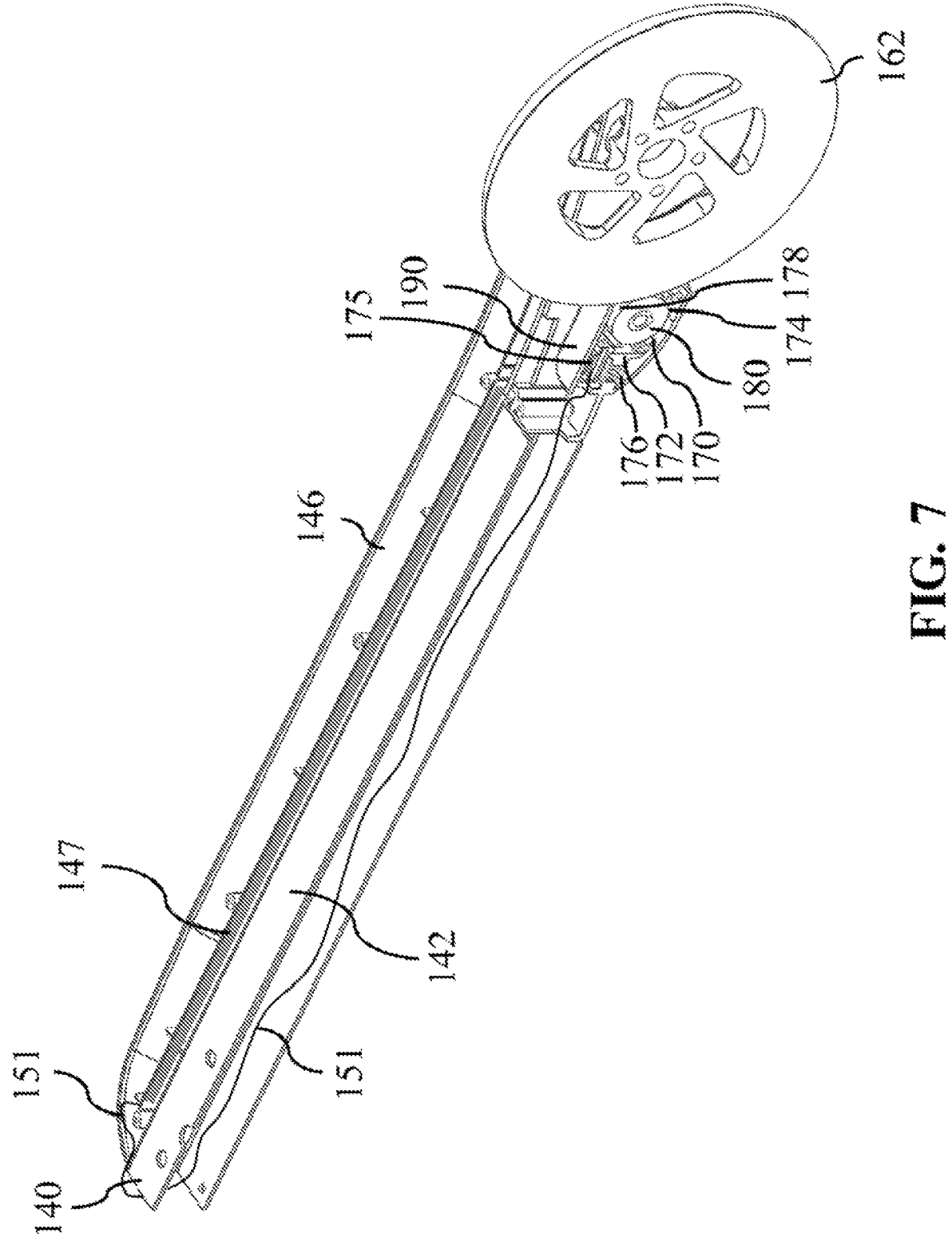
FIG. 7 is a cross-sectional perspective view of the rear portion of the personal mobility device of FIG. 6 according to an embodiment.

With reference to FIGS. 1-14, an example embodiment of a personal mobility device 100 is disclosed. Personal mobility device 100 is configured to provide a user with personal mobility, e.g., personal transportation from place to place. In an illustrative embodiment, personal mobility device 100 comprises a scooter, e.g., as shown in FIG. 1. In other embodiments, personal mobility device 100 may comprise other devices that may be used to transport a user including bicycles, skateboards, unicycles, hoverboards, tricycles, 3-wheels, ride-ons, strollers, carts or any other personal mobility device. In an illustrative embodiment, personal mobility device 100 is configured to generate power for powering a load component such as, e.g., a lighting element, speaker, battery charging device or any other load component that is configured to utilize electrical energy, due to physical effort of the user during use of personal mobility device 100.

With reference to FIGS. 1-4, in an example embodiment, personal mobility device 100 comprises a handlebar 110, stem 120, folding mechanism 130, support structure 140, wheels 160 and 162 and a generator device 170. In other embodiments, other configurations may alternatively be utilized including, e.g., an alternative folding mechanism 130, multiple support structures 140, additional or fewer wheels 160/162, or any other alternative components or configurations.

Stem 120 comprises a shaft 122 that is inserted into a steering column 124. In some embodiments, shaft 122 may be secured to steering column 124 by a clamp or other mechanism that inhibits rotation, linear translation, or both rotation and linear translation of shaft 122 relative to steering column 124. In some embodiments, linear translation of shaft 122 relative to steering column 124 may alternatively be inhibited by another mechanism such as, e.g., by engagement of a detent of shaft 122 with a groove or hole of steering column 124 or vice versa. For example, a spring-loaded detent of shaft 122 may be configured to extend through a hole in steering column 124 to inhibit linear translation of shaft 122 relative to steering column 124. In some embodiments, steering column 124 may comprise multiple holes into which the detent may be engaged to adjust a height of handlebar 110 relative to wheel 160.

Steering column 124 comprises one or more flanges 126 that are secured to wheel 160 in a manner that allows wheel 160 to rotate. As an example, a shaft or another member may engage with or extend through wheel 160 and be secured to flanges 126 where wheel 160 is configured to rotate about the shaft or other member. Other mechanisms for attaching wheel 160 to steering column 124 may alternatively be utilized. In an illustrative embodiment, rotation of steering column 124, e.g., by handlebar 110 via shaft 122, is configured to cause a corresponding rotation of wheel 160 to change a direction of travel. In other embodiments, any other mechanism for rotating wheel 160 or adjusting wheel 160 to change the direction may alternatively be utilized.

A folding mechanism 130 attaches support structure 140 to steering column 124. As an example, folding mechanism 130 may comprise a strut 132 and a hinge 134. Any other folding mechanism may alternatively be utilized. As shown in FIGS. 1-4, strut 132 comprises a shaft 136 through which steering column 124 is inserted to enable rotation of steering column 124 relative to shaft 136. A clamp 128 or another mechanism is utilized to inhibit linear movement of shaft 136 relative to steering column 124. As an example, clamp 128 may be attached to steering column 124 above shaft 136 to inhibit linear movement of shaft 136 relative to steering column 124.

Hinge 134 is attached to support structure 140 and is configured to enable support structure 140 to be rotated relative to steering column 124, e.g., about a pivot point 136 or another portion of hinge 134. For example, strut 132 is configured in a hinged arrangement with hinge 134 such that strut 132 rotates about hinge 134, e.g., along a channel, axis, pivot point 136 or another mechanism in hinge 134. While personal mobility device 100 is described and illustrated as comprising folding mechanism 130 in the embodiment shown in FIGS. 1 to 4, in an alternatively embodiment, no folding mechanism 130 is included in personal mobility device 100 and strut 132 or a similar component may alternatively be secured directly to support structure 140 without first being connected to a hinge 134.

With reference to FIGS. 1-14, support structure 140 comprises a support member 142, side member 144 and side member 146. A platform 148 is mounted to the support member 142, side member 144 and side member 146. Support member 142 may comprise, for example, a strut, tube, brace or any other component that is configured to provide structural support to side members 144 and 146 and platform 148. In some cases, platform 148 may also be referred to herein as a deck 148 and is configured to support a user, e.g., standing on platform 148 while using personal mobility device 100. In other embodiments or for other types of personal mobility devices 100 such as, e.g., a bicycle, support structure 140 may comprise one or more support members, struts, tubes, braces or other components disposed between wheels 160 and 162 that connect wheels 160 and 162 together directly or via one or more additional components of personal mobility device 100. As an example, support structure 140 connects wheel 160 to wheel 162 via steering column 124 and folding mechanism 130. In an embodiment where personal mobility device 100 comprises a bicycle, the support structure may connect the wheels together via one or more support members, struts, tubes, braces or other components and in some embodiments, may support other components instead of or in addition to platform 148 such as, e.g., a seat.

In some embodiments, one or more of support member 142, side members 144 and 146 and platform 148 may comprise one or more load components 149 (FIGS. 6-9 and 21) such as, e.g., a lighting element, speaker, battery charging device or any other load component that is configured to utilize electrical energy generated by generator device 170. With reference to FIGS. 6-9 as an example, lighting elements 147 may be attached to side members 144 and 146 and connected to generator device 190 by wiring 151. Lighting elements 147 may comprise, for example, light emitting diodes (LEDs) or any other form of lighting. Wiring 151 may for example, electrically couple generator 174 to a circuit board 175 and circuit board 175 to lighting elements 147 via support member 142 to provide power to lighting elements 147. In some embodiments, any other component of personal mobility device 100 may comprise a load component 149 including, e.g., handlebar 110, stem 120, folding mechanism 130 and wheels 160 and 162.

Support structure 140 further comprises a stand 150 attached to support member 142 or one of side members 144 and 146 and a distal portion 152. Stand 150 is configured to hold personal mobility device 100 upright without user assistance, e.g., when a user is not using personal mobility device 100.

Distal portion 152 is configured to engage and support wheel 162 and enable wheel 162 to rotate relative to support structure 140. For example, distal portion 152 may comprise one or more flanges 154 and a shaft or another member may engage with or extend through wheel 162 and be secured to flanges 154 where wheel 162 is configured to rotate about the shaft or other member. Other mechanisms for attaching wheel 162 to support structure 140 may alternatively be utilized.

An optional mud guard 156 extends from distal portion 152 and is configured to inhibit mud or other materials from being kicked up off a riding surface and onto the user while personal mobility device 100 is in motion.

Support structure 140 further comprises a housing 190 attached to distal portion 152 in proximity to wheel 162 that is configured to support a generator device 170. Generator device 170 is configured to generate electrical power based at least in part on a rotation of wheel 162. In some embodiments, generator device 170 is removably attached to housing 190. For example, generator device 170 may be removably or fixedly received in housing 190. In an embodiment, housing 190 is attached to support structure 140 by a bracket 192 and disposed below the portion of platform 148 covering distal portion 152. In other embodiments, housing 190 may be formed as part of support member 142 or attached to any other portion of personal mobility device 100. As an example, housing 190, or generator device 170 itself, may be attached to an axle of wheel 162 or to another component of personal mobility device 100 in some embodiments.

With reference to FIGS. 6-14, generator device 170 comprises a housing 172, a generator 174 and a biasing member 176. Housing 172 comprises a housing component 172A and a housing component 172B that are coupled together to partially encase generator 174 while leaving a portion of generator 174 exposed. Generator 174 comprises a rotor 178 and a stator 180. Stator 180 is mounted on a stem 182 of housing 172B and is inhibited from rotating relative to housing 172 by engagement between a detent 184 of stem 182 and a corresponding channel 186 of stator 180. In other embodiments, stator 180 may comprise a detent while stem 182 may comprise a corresponding channel. While described as being contained in a housing 172, in other embodiments, any of generator 174, biasing member 176, rotor 178 and stator 180 may be attached together or separately attached as components of personal mobility device 100 without being contained in a housing.

Figure 19:
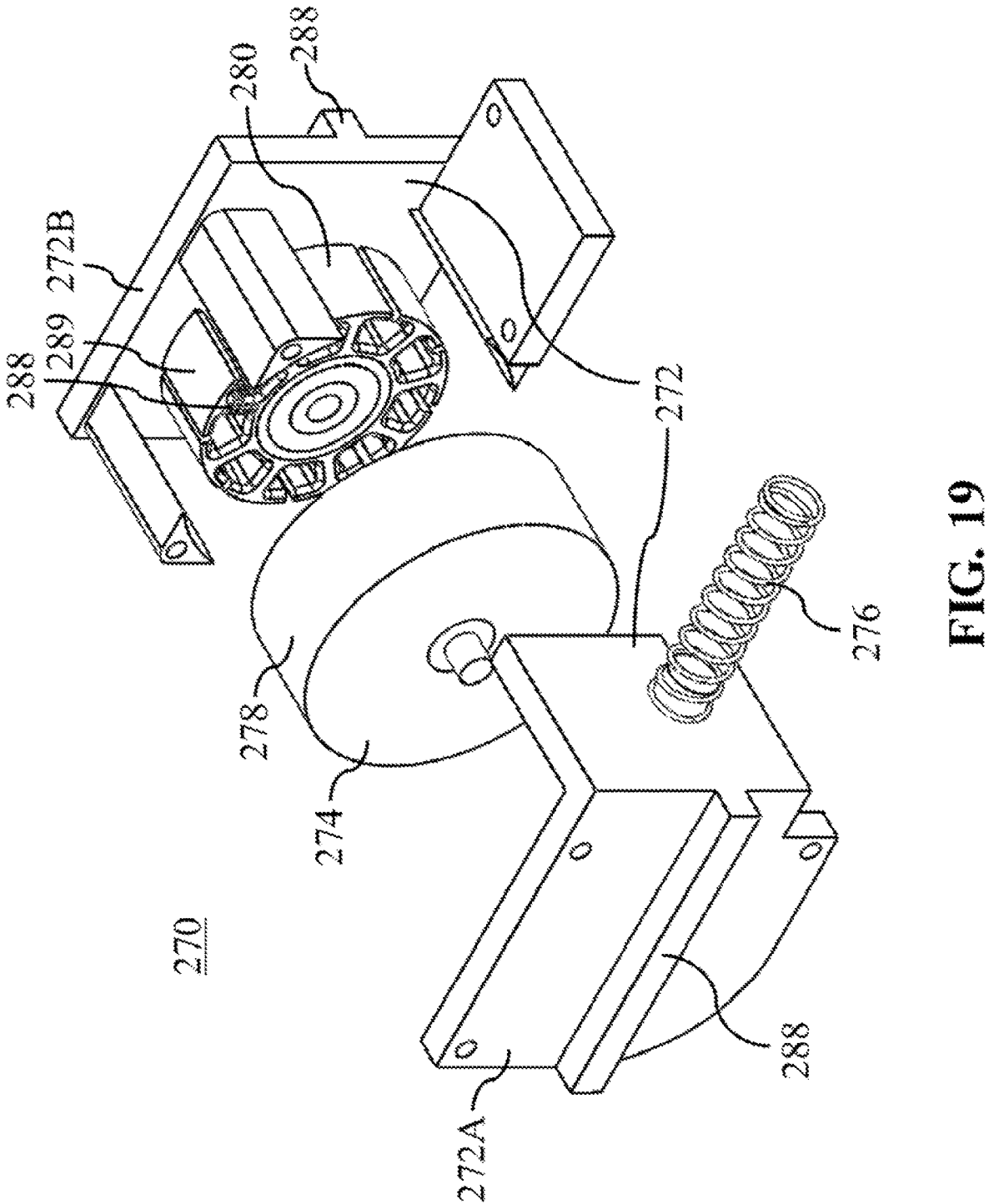
FIGS. 19 and 20 are exploded perspective views of the generator device of the personal mobility device of FIG. 15 according to an embodiment.
Figure 20:
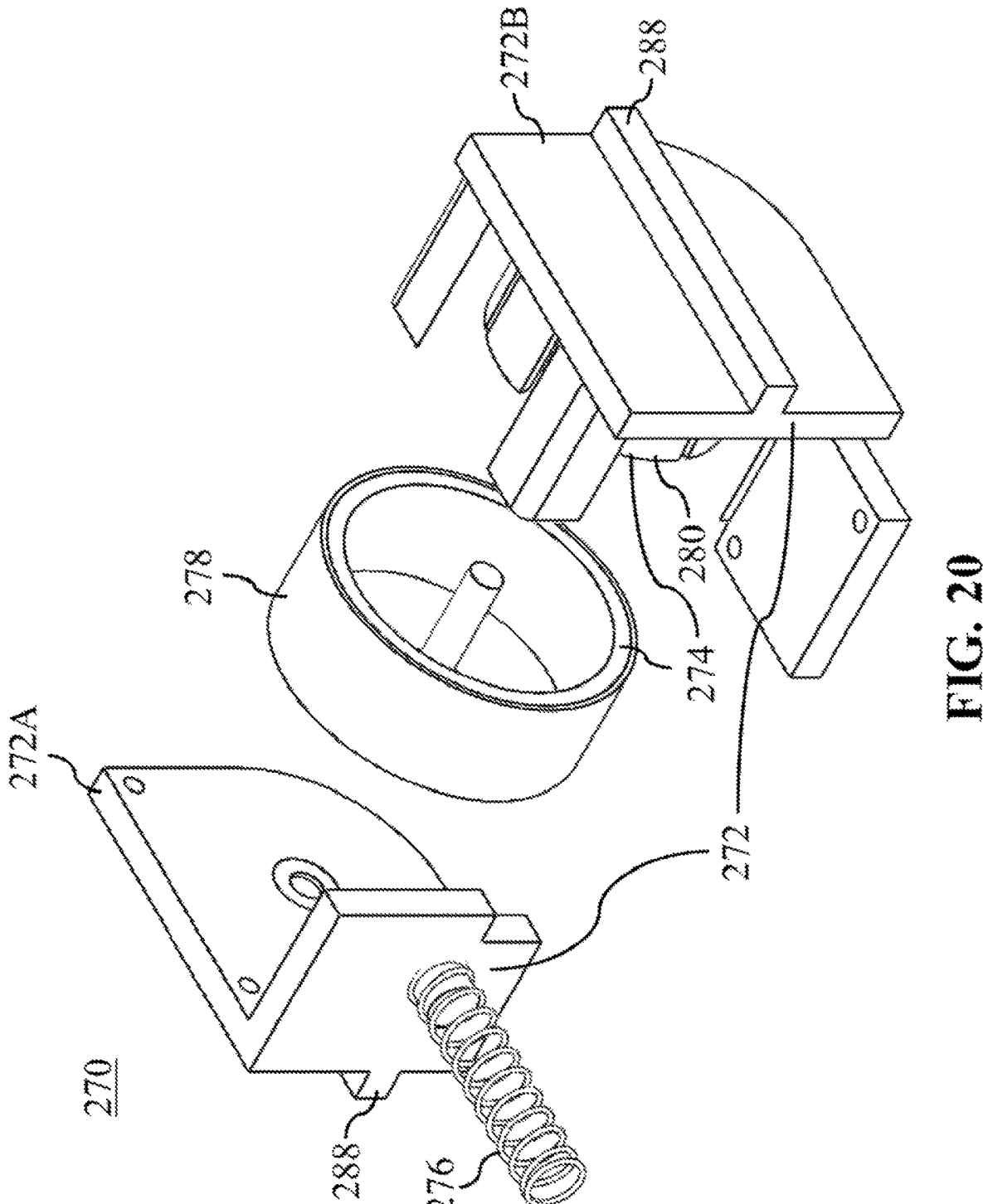

In an illustrative embodiment, rotor 178 comprises one or more permanent magnets and stator 180 comprises one or more wire windings. An example of such a wire winding is shown in the embodiment of FIG. 19 where one or more wires 288 are wound around teeth 289 of a stator 280 as an example. For the sake of brevity, the full set of wires 288 wound around teeth 289 are not shown in FIG. 19. Any known type of wire winding may be utilized. Example permanent magnets that may be utilized in generator 174 include ceramic, alnico, ferrite, samarium-cobalt, neodymium-iron-boron or any other types of permanent magnets. In other embodiments, rotor 178 may comprise the wire windings while stator 180 may comprise the permanent magnets. In some embodiments, both rotor 178 and stator 180 may comprise wire windings.

While generator 174 is describe as comprising a rotor and stator, any other type of generator that is configured to convert a mechanical energy input into an electrical current output may alternatively be utilized. In some embodiments, generator 174 is an alternator, e.g., an alternating current (AC) electric generator. In some embodiments, generator 174 may be configured to generate a direct current (DC) output.

Figure 8:
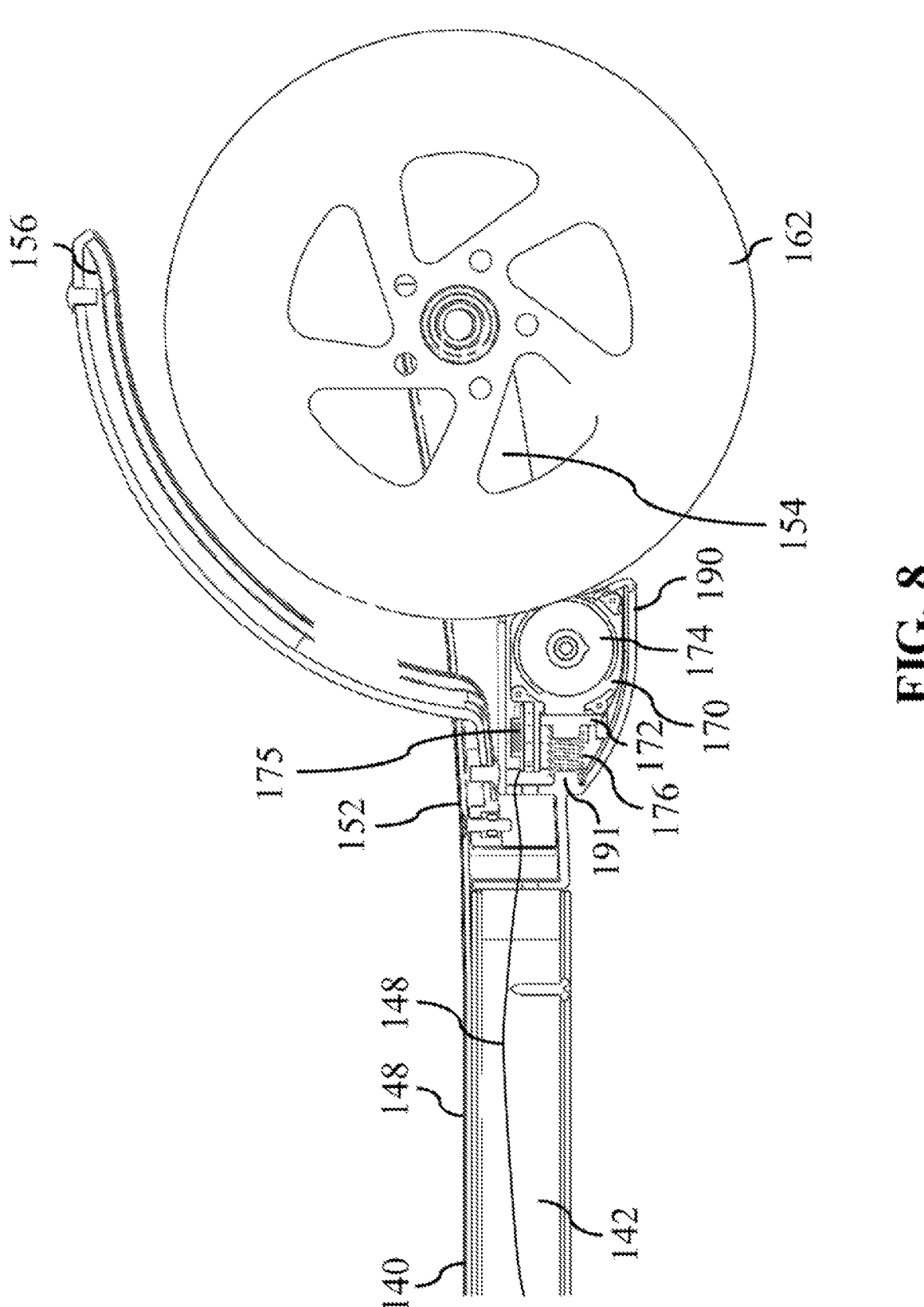
FIG. 8 is an expanded cross-sectional side view of the rear portion of the personal mobility device of FIG. 7 according to an embodiment.
Figure 9:
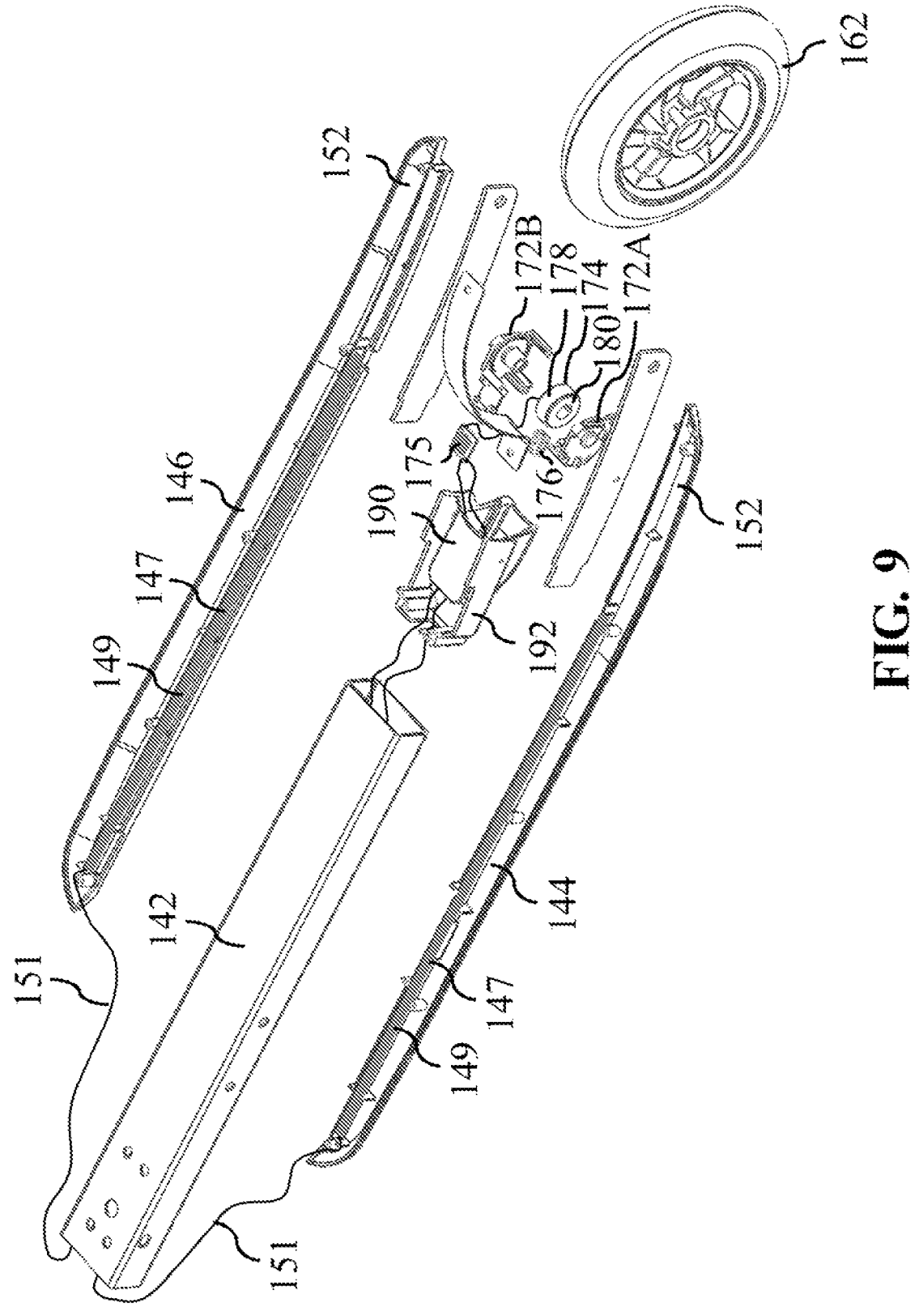
FIG. 9 is an exploded perspective view of the rear portion of the personal mobility device of FIG. 1 with some components removed according to an embodiment.
Figure 10:
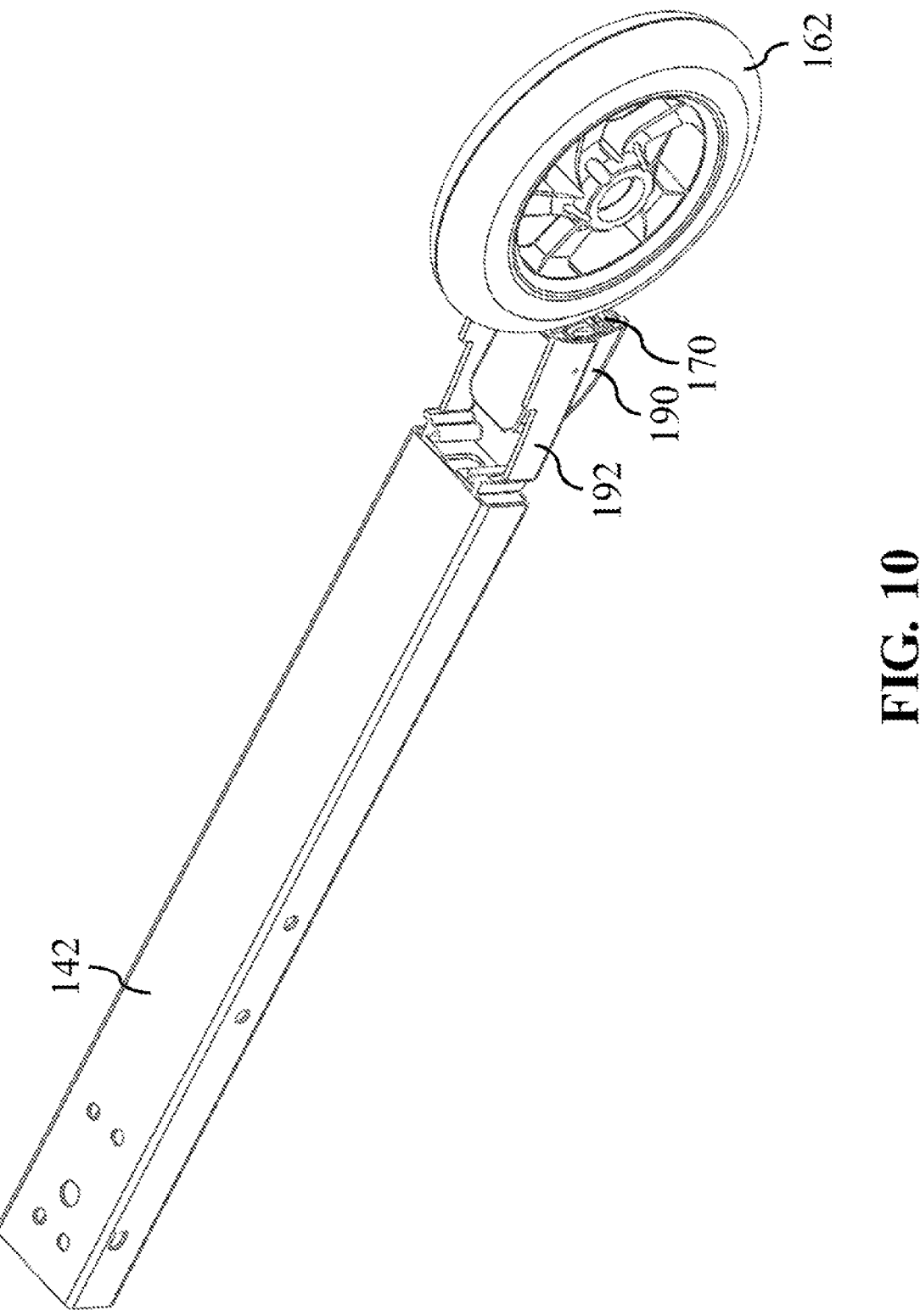
FIG. 10 is a perspective view of the rear portion of the personal mobility device of FIG. 1 showing a support structure, a housing, a generator device and a wheel according to an embodiment.
Figure 11:
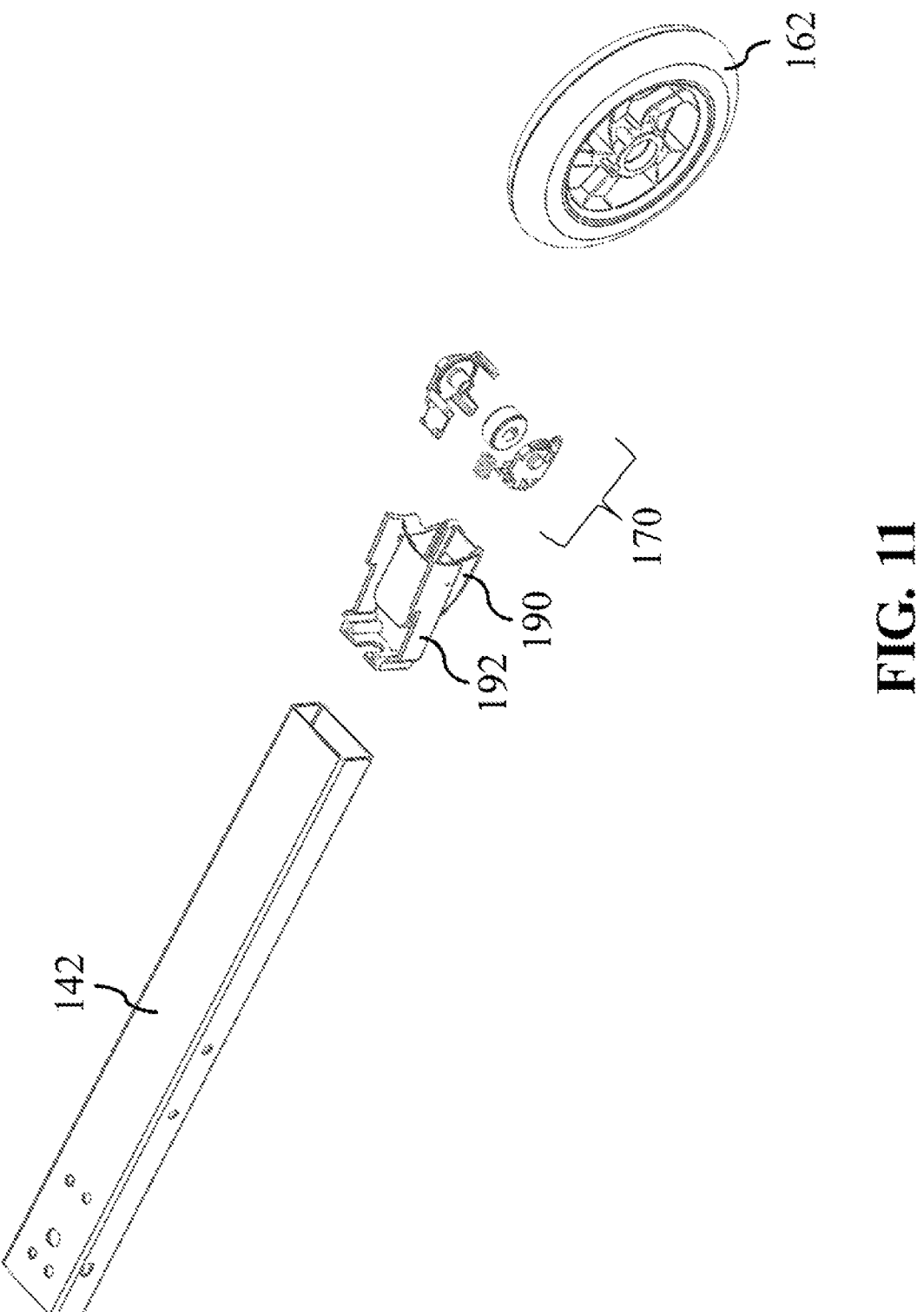
FIG. 11 is an exploded perspective view of the rear portion of the personal mobility device of FIG. 10 according to an embodiment.

Biasing member 176 comprises a spring, shape memory material or any other biasing member that may be utilized to bias housing 172 and generator 174 toward wheel 162. As shown in FIG. 8, for example, a biasing member 176 such as, e.g., a spring, engages against a portion of housing 190 of support structure 140 and against a portion of housing 172 to bias housing 172 and generator 174 toward wheel 162 such that rotor 178 is in contact and frictional engagement with wheel 162. In an illustrative embodiment, rotation of wheel 162, e.g., due to physical effort of the user during use of personal mobility device 100, causes a corresponding rotation of rotor 178 about stator 180 due to frictional engagement between wheel 162 and rotor 178. Rotation of rotor 178 about stator 180 generates an electrical current in the wiring of stator 180 that may be utilized to power a load such as, e.g., load component 149. In some embodiments, biasing member 176 may be configured to selectively bias generator 174 toward wheel 162. For example, biasing member 176 may comprise a user actuated mechanism that configures biasing member 176 for biasing generator 174 toward wheel 162 or to remove the biasing of generator 174 toward wheel 162. In some embodiments, no biasing member or a weak biasing member 176 may be utilized and generator device 170 may alternatively be positioned above wheel 162 such that gravity biases generator 174 into engagement against wheel 162. In some embodiments, biasing member 176 may alternatively bias generator 174 into frictional or another form of engagement with another rotating portion of personal mobility device 100 such as, e.g., an axle, or any other portion of personal mobility device 100. In some embodiments, biasing member 176 may alternatively bias generator 174 into frictional engagement with a surface separate from personal mobility device 100 such as, e.g., the ground.

Figure 12:
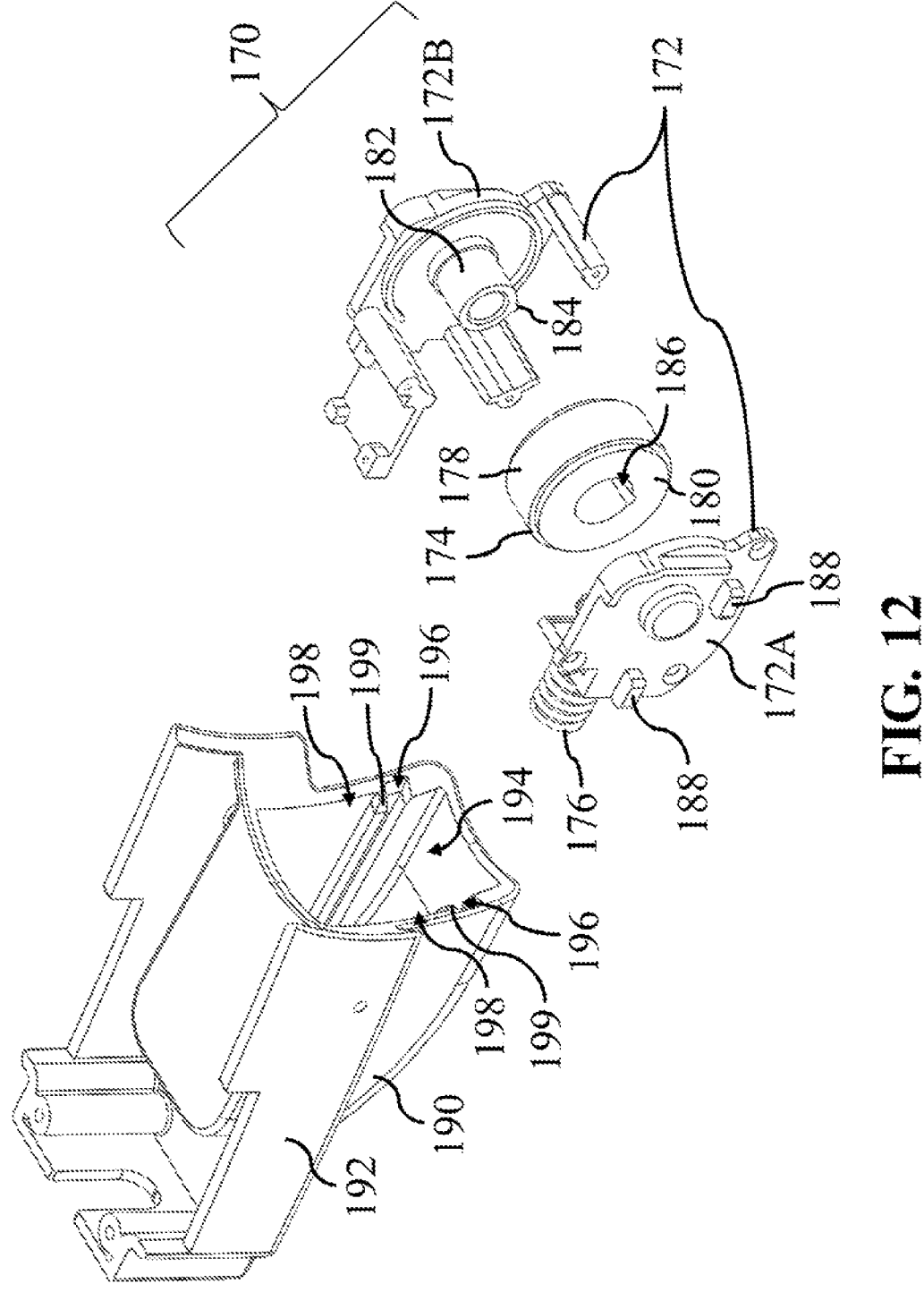
FIG. 12 is an exploded perspective view of a housing of the support structure and a generator device of the personal mobility device of FIG. 11 according to an embodiment.
Figure 13:
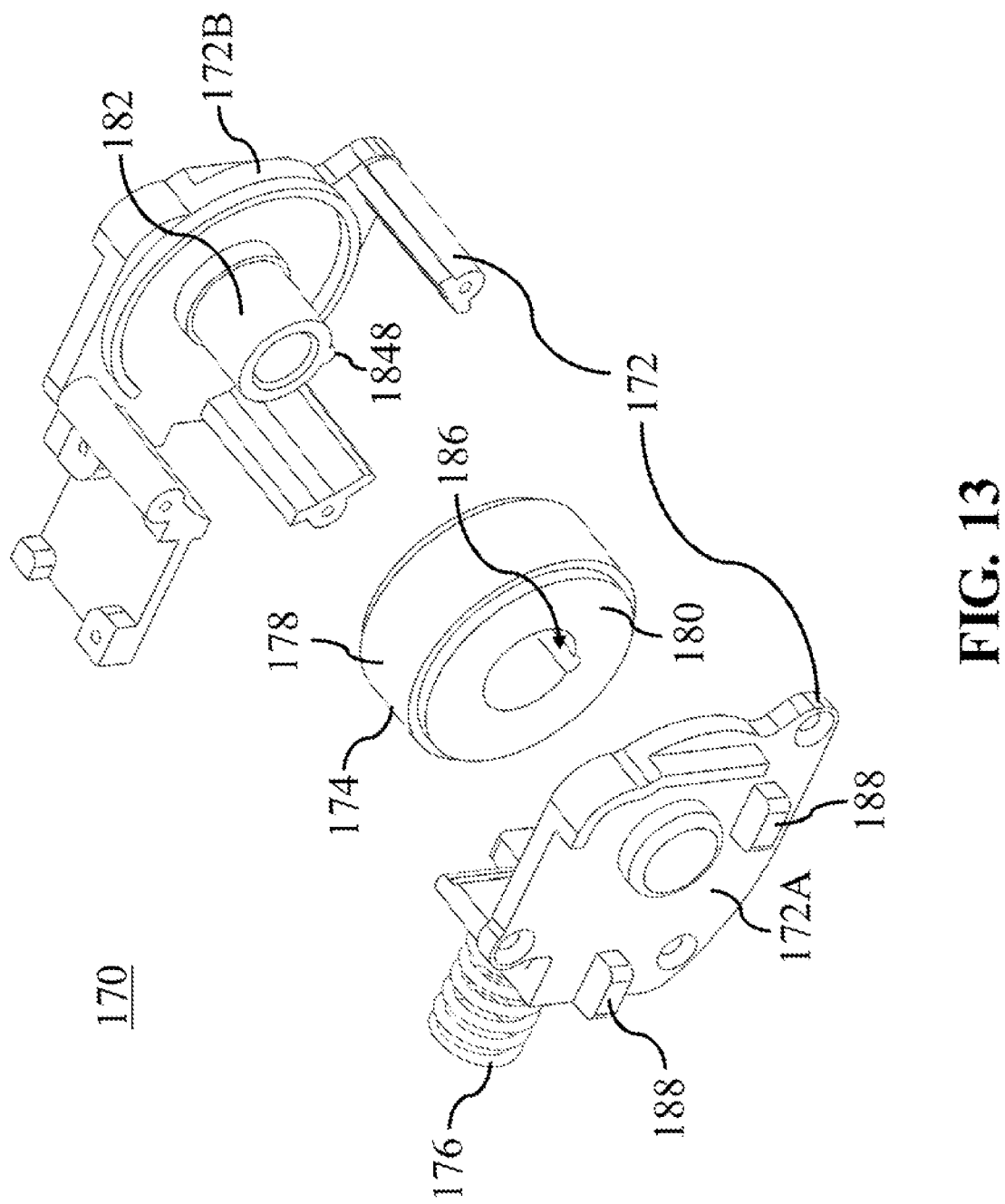
FIGS. 13 and 14 are exploded perspective views of the generator device of the personal mobility device of FIG. 12 according to an embodiment.
Figure 14:
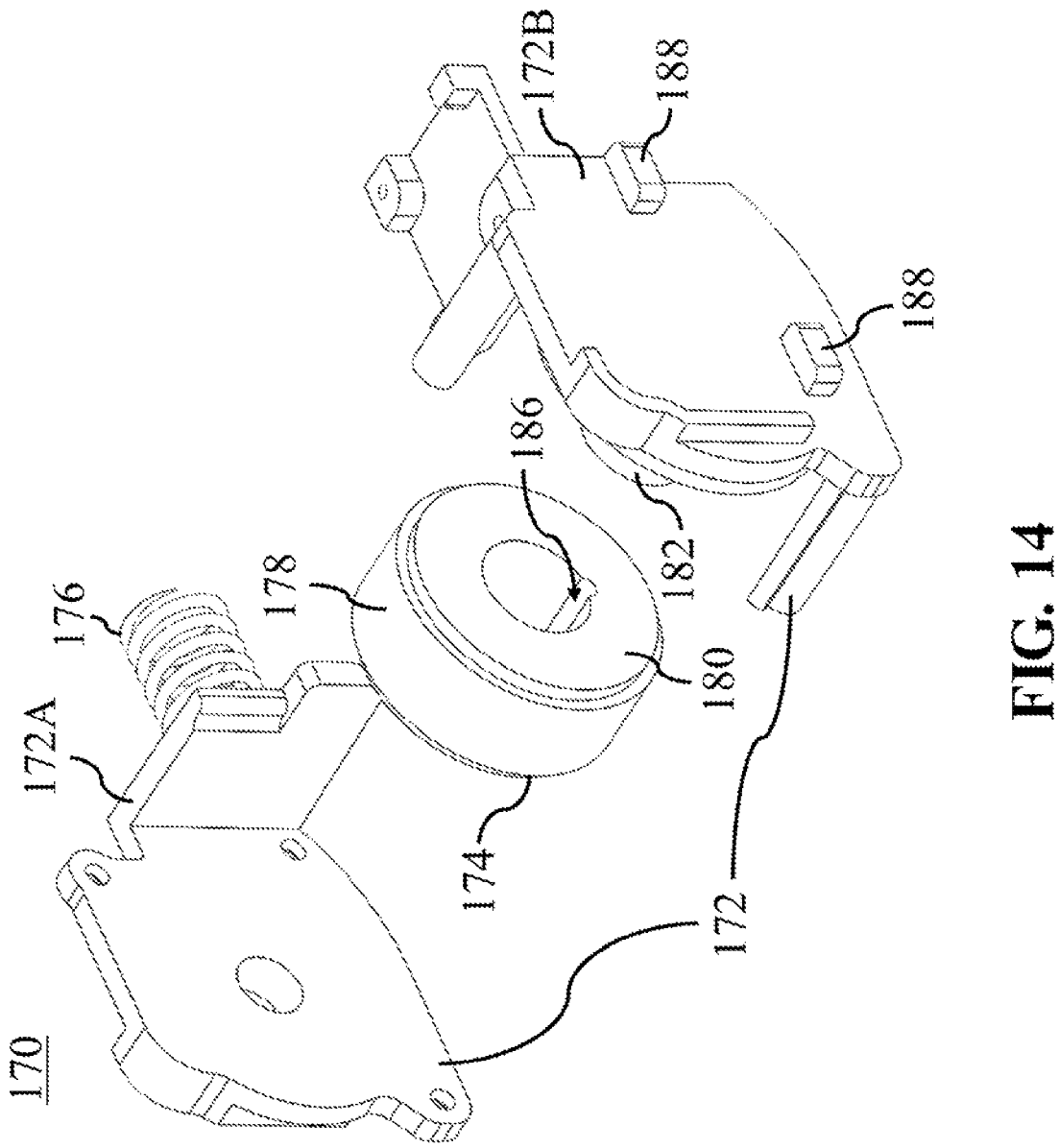

With reference to FIGS. 12-14, generator device 170 is configured for removable insertion into a cavity 194 of housing 190. In some embodiments, for example, generator device 170 comprises detents or flanges 188 that are configured to mesh with channels 196 and 198 of housing 190 about a corresponding flange 199 of housing 190 when generator device 170 is inserted into cavity 194 such that generator device 170 may slide linearly relative to cavity 194 along flange 199. As shown in FIG. 8, when generator device 170 is inserted into cavity 194 of housing 190, biasing member 176 engages against housing 190 to bias generator device 170 towards wheel 162. In some embodiments, e.g., as shown in FIG. 8, biasing member 176 may be configured to engage against and partially surround a detent 191 of housing 190, e.g., to inhibit a deflection of biasing member 176 off axis during a linear movement of generator device 170. In other embodiments, other methods for removably, semi-permanently or permanently inserting or attaching generator device 170 to housing 190 or support structure 142 may alternatively be utilized including, e.g., pressure fit, rachets, adhesives, clasps, straps, snap-fit or any other method of attachment.

With reference now to FIGS. 15-20, an example embodiment of a personal mobility device 200 is disclosed. Personal mobility device 200 is similar to personal mobility device 100 and will described with like reference numbers to denote similar components where possible. For the sake of brevity, FIGS. 15-18 illustrate the distal portion of personal mobility device 200. It is understood that personal mobility device 200 may comprise a scooter similar to that illustrated and described with reference to FIGS. 1-4, a bicycle, a skateboard or any other type of personal mobility device. Components of personal mobility device 200 that are similar to those described above with reference to personal mobility device 100 will not be described in detail for the sake of brevity. Instead, only differences between personal mobility device 200 and personal mobility device 100 will be described where possible.

Figure 15:
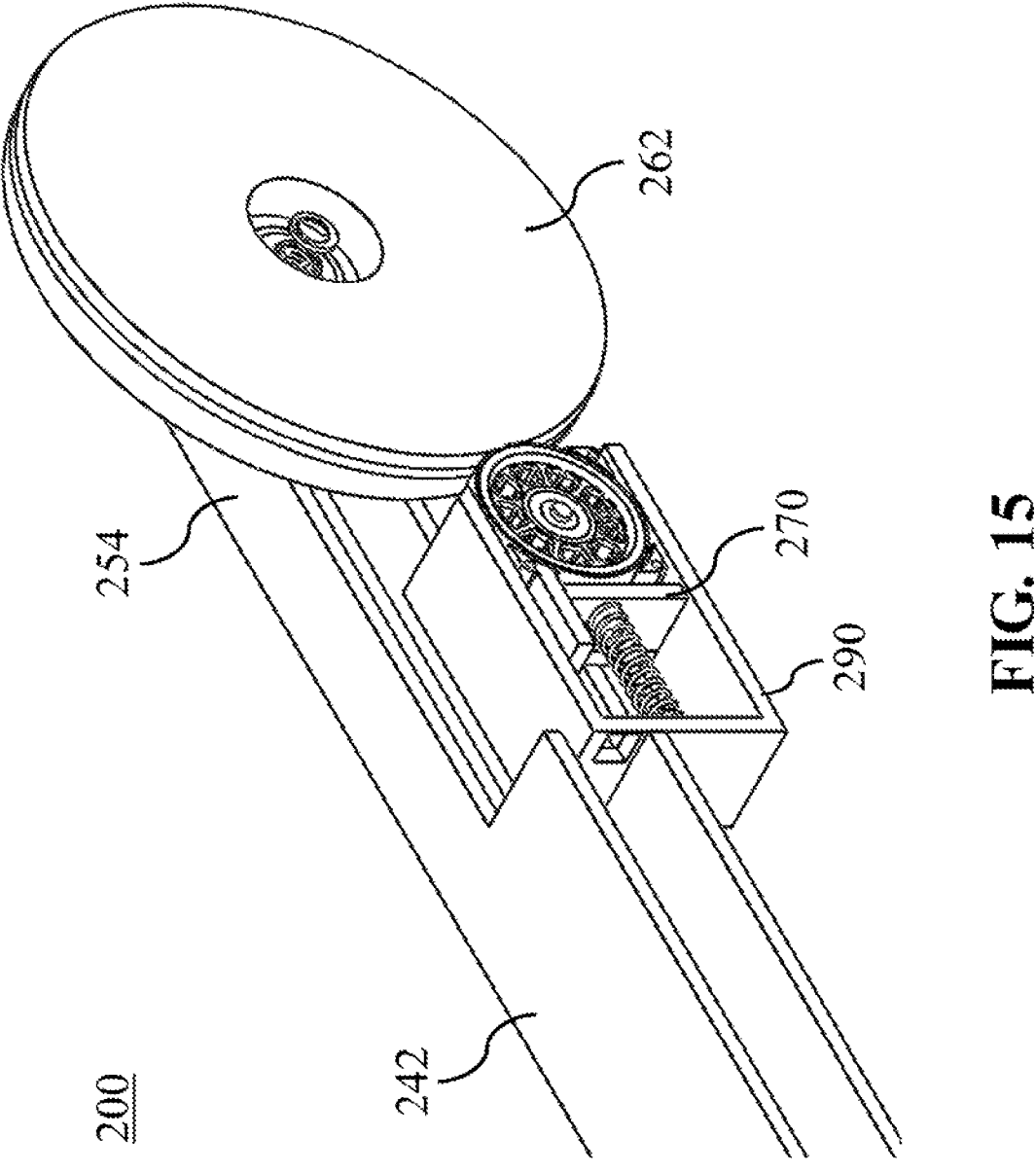
FIG. 15 is a cross-sectional perspective view of a distal portion of a personal mobility device according to an embodiment.
Figure 16:
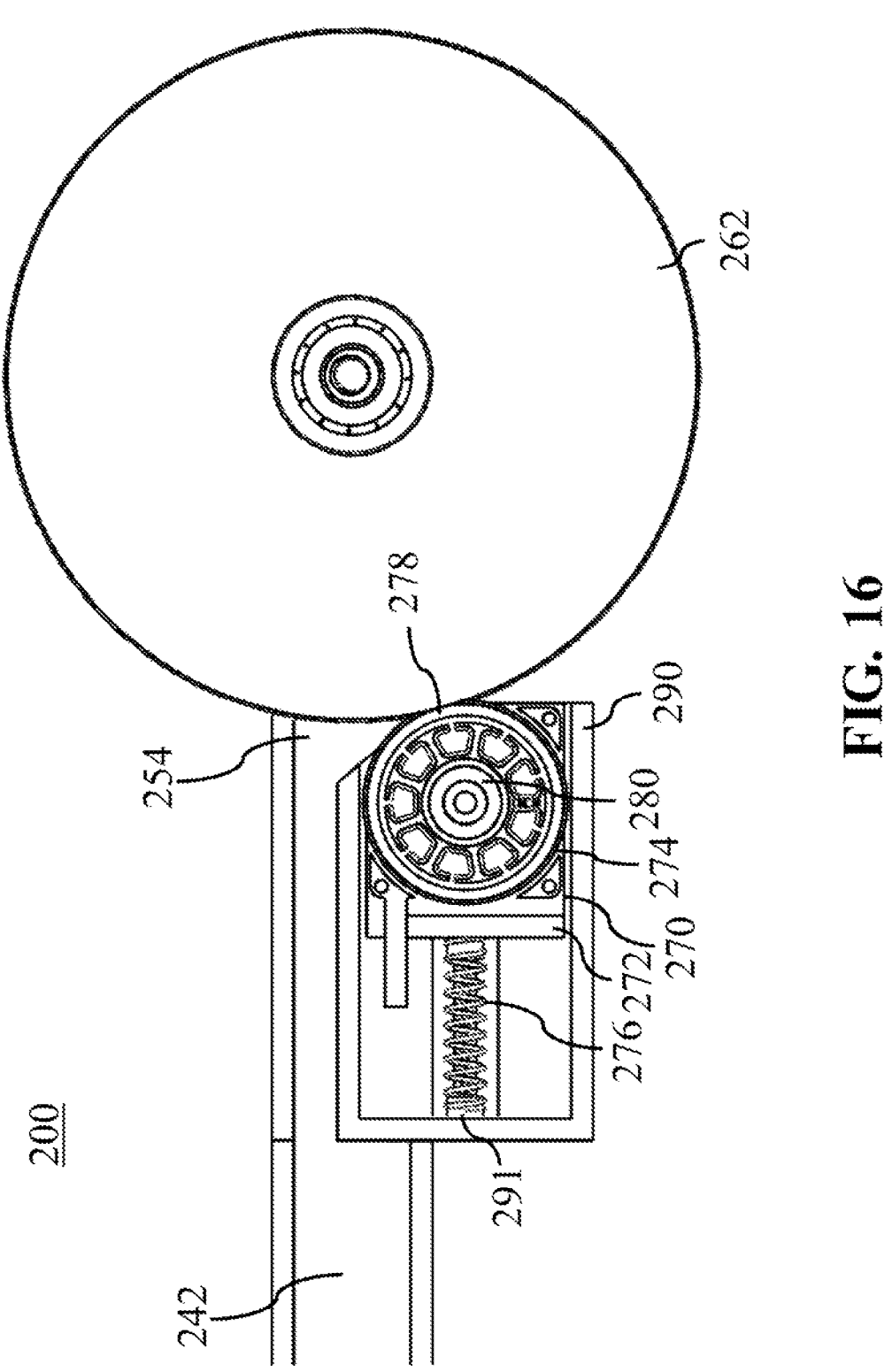
FIG. 16 is a cross-sectional side view of the rear portion of the personal mobility device of FIG. 15 according to an embodiment.
Figure 17:
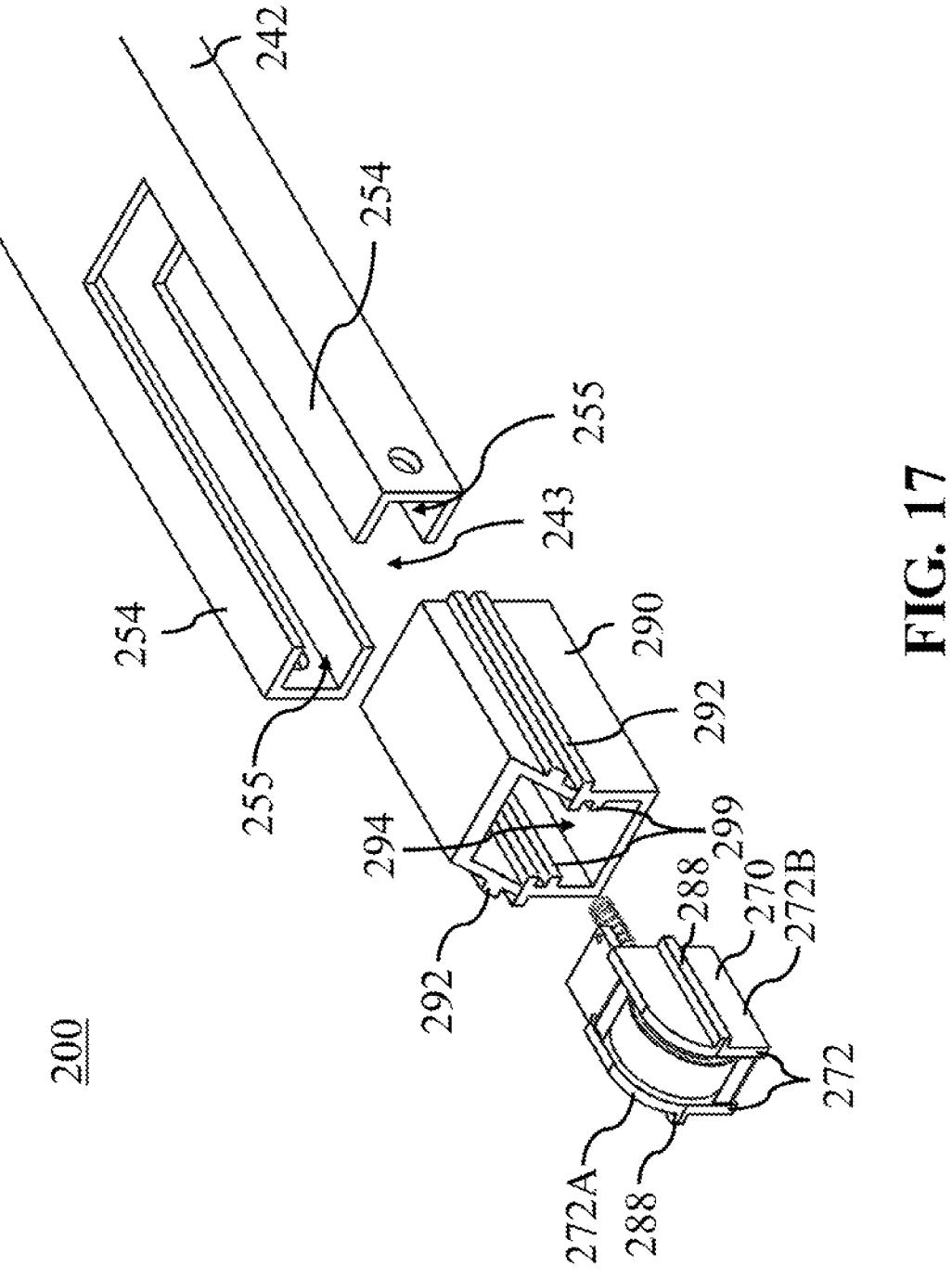
FIG. 17 is a partial exploded perspective view of the rear portion of the personal mobility device of FIG. 15 according to an embodiment.
Figure 18:
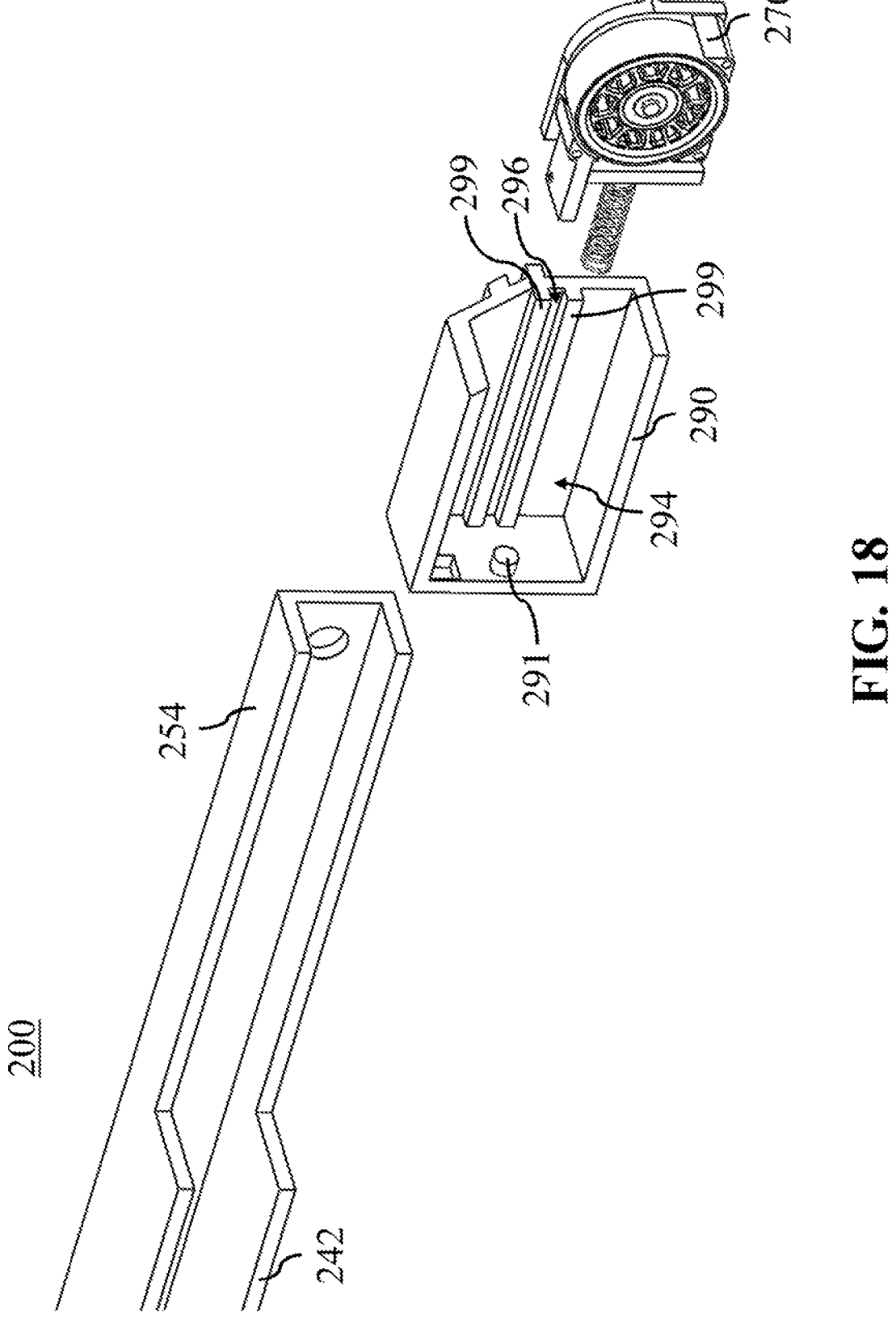
FIG. 18 is a cross-sectional exploded perspective view of the rear portion of the personal mobility device of FIG. 17 according to an embodiment.

As shown in FIGS. 15 and 16, personal mobility device 200 comprises a support structure 242, a housing 290, a generator device 270 and a wheel 262.

Support structure 242 comprises one or more flanges 254 that are configured to engage and support wheel 262, e.g., as described above for flanges 154. In addition, support structure 242 comprises a cavity 243 and channels 255 that are configured to receive at least a portion of housing 290. In some embodiments, for example, housing 290 is configured to linearly slide into cavity 243 via engagement between flanges 292 disposed on outer surfaces of housing 290 and channels 255.

Housing 290 further comprises a cavity 294, detent 291, and flanges 299 on inner side surfaces thereof. The flanges 299 on each inner side surface define a channel 296 that is configured to receive corresponding flanges 288 disposed on the outer surfaces of each of housing components 272A and 272B of housing 272 when generator device 270 is inserted into cavity 294. For example, in some embodiments, generator device 270 is configured to linearly slide relative to housing 290 due to the insertion of flanges 288 in channels 296 and engagement of flanges 288 with flanges 299 of housing 290. Biasing member 276 is configured to engage detent 291 in a similar manner to biasing member 176 and detent 191 as described above. In this manner, generator device 270 is configured to be removably inserted into housing 190 and housing 190 is configured to be removably inserted into support structure 242. In other embodiments, other methods for removably, semi-permanently or permanently inserting or attaching generator device 270 to housing 290 or support structure 242 may alternatively be utilized including, e.g., pressure fit, rachets, adhesives, clasps, straps, snap-fit or any other method of attachment.

With reference again to FIGS. 15-20, generator device 270 comprises housing 272, a generator 274 and biasing member 276. Generator 274 comprises a rotor 278 and a stator 280, similar to generator 174 as described above. FIGS. 15-20 also show the internal components of stator 280 including, e.g., wires 288 and teeth 289, as described above. In some embodiments, stator 280 may be secured as part of housing 272. In other embodiments, a detent and channel may alternatively be utilized to inhibit rotation of stator 280 relative to housing 272 such as described above with reference to stator 180 and housing 172.

Figure 21:
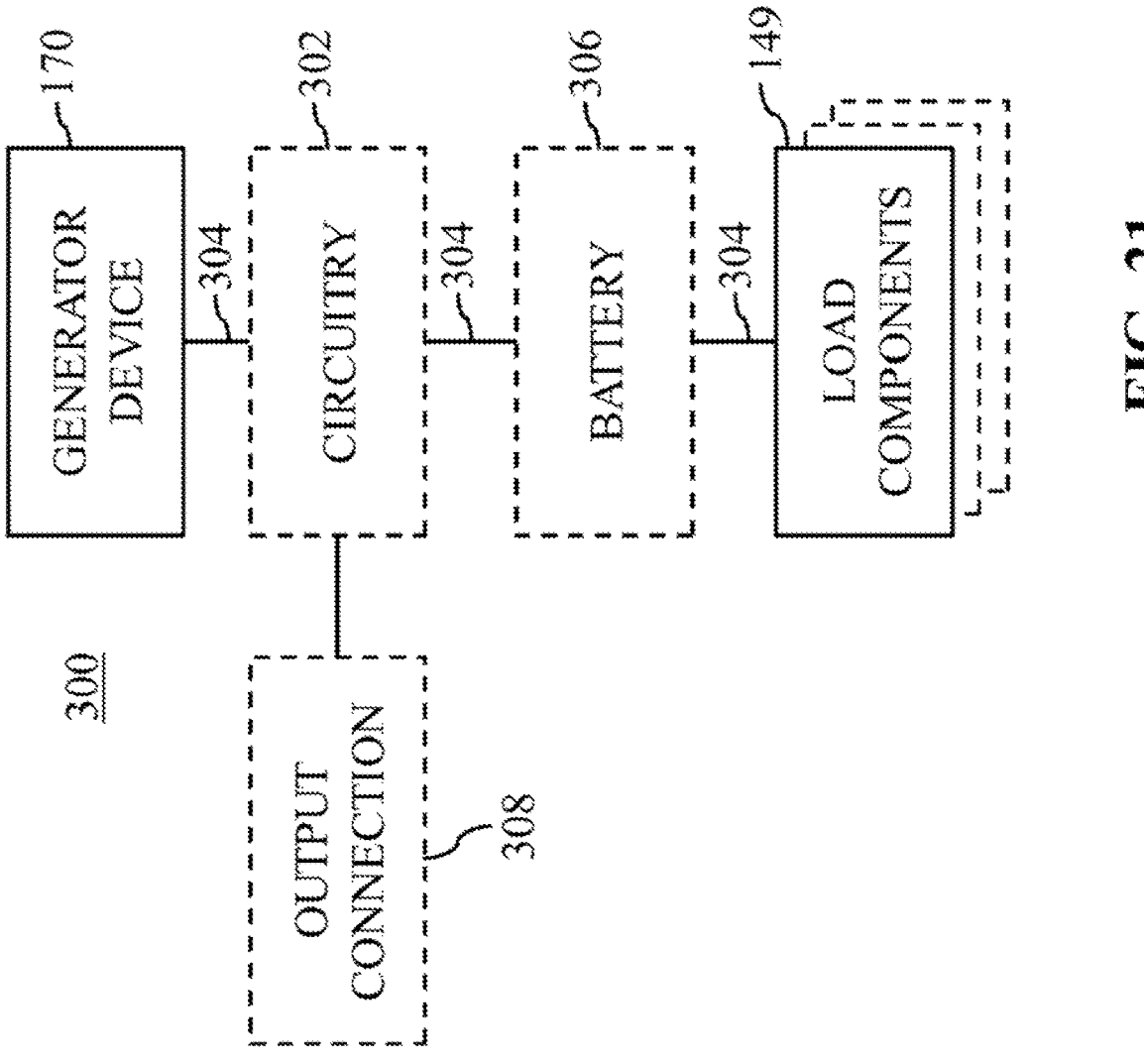
FIG. 21 is an example electrical system block diagram of the personal mobility device of FIG. 1 according to an embodiment.

With reference to FIG. 21, a block diagram of an example electrical system 300 of personal mobility device 100 will be described. A similar electrical system may also be utilized for personal mobility device 200. As shown in FIG. 21, generator device 170 is electrically connected to circuitry 302 and load components 149 by one or more wires 304. In some embodiments, circuitry 302 may be optional as denoted by the dashed lines where, for example, generator device 170 may be electrically connected directly to one or more load components 149 by wires 304. In an embodiment, electrical system 300 may optionally comprise an electrical storage component 306 that is configured to supply power to load components 149 and be recharged by generator device 170 and circuitry 302. In some embodiments, electrical system 300 may supply power to load components 149 from either electrical storage component 306, generator device 170, or both electrical storage component 306 and generator device 170, e.g., in parallel or in combination. For example, in a case where a larger voltage or current is desired, the output charge from electrical storage component 306 may be supplemented by the output of generator device 170. In some embodiments, electrical storage component 306 may comprise a battery, one or more capacitors, or any other electrical storage component.

In some embodiments, generator device 170 may be connected to an external output connection 308 by wires 304 directly or via circuitry 302. Output connection 308 may comprise, for example, a port, plug or any other connection to which another device may be plugged in. In some embodiments, output connection 308 may comprise a wireless power transmitter that is configured to wirelessly transmit power to a wireless power receiver found in another device that is separate from personal mobility device 100. As an example, the wireless power transmitter may comprise a transmission coil or other wireless mechanism for transmitting power and the other device may comprise a receiving coil. A mobile phone is an example of a separate device that may comprise a wireless power receiver. In some embodiments, output connection 308 may comprise both wired and wireless connections including, e.g., ports, plugs, sockets, wireless power transmitters or any other components that are configured to provide the electrical power generated by generator device 170 to another device that is separate from personal mobility device 100. In other embodiments, any other configuration or electrical system 300 may alternatively be utilized to connect generator device 170 to load components 149 or to other devices via output connection 308.

Figure 22:
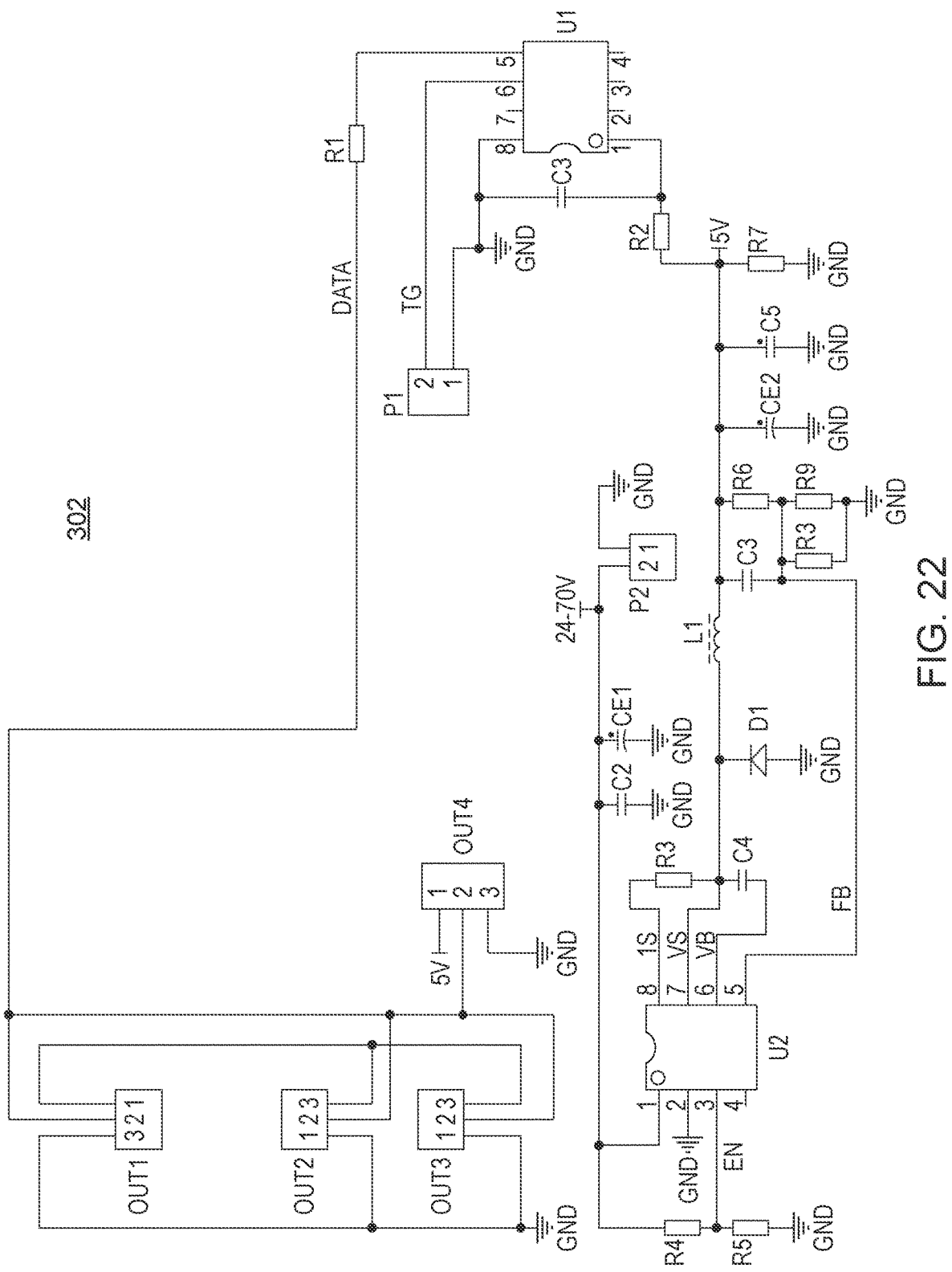
FIG. 22 is an example circuit diagram of the personal mobility device of FIG. 1 according to an embodiment.

With reference to FIG. 22, an example electrical diagram of circuitry 302 that may be utilized to handle the output from generator 174 will be described. Similar circuitry may be utilized for generator 274. Circuitry 302 comprises a variety of circuit components including, e.g., resistors, capacitors, diodes, coils, processing devices, transistors or other semiconductor devices or any other electrical components. In some embodiments, for example, circuitry 302 is configured to perform voltage regulation to stabilize and adjust the output voltage from stator 180 to a target voltage for a particular load application. As an example, circuitry 302 may comprise voltage regulator components such as, e.g., linear voltage regulators, switching voltage regulators, low-dropout regulators (LDOs), boost switching regulators, buck switching regulators, boost/buck switching regulators or any other type of voltage regulator. In an example, circuitry 302 may be configured to regulate the voltage output for a particular load, e.g., to a particular voltage level, current level or in any other manner. In some embodiments, other circuitry may alternatively be utilized depending on the particular load component 149.

Personal mobility device 100 (and 200) as described herein enables kinetic rotational energy of a wheel 162 that is generated by the use of the personal mobility devices 100 by a user, e.g., by kicking, dragging, running, pushing or otherwise driving a movement of personal mobility device 100 that causes rotation of wheel 162, to be transferred to a generator 174 through direct frictional contact between a rotor 178 of generator 174 with wheel 162. Rotor 178 then transfers the energy to stator 180 via magnetic coupling to cause a current output that may be utilized to power one or more load component 149 such as, e.g., lighting elements, speakers, batteries or any other load device.

While described with respect to personal mobility devices 100 and 200 and wheels 162/262, generator devices 170/270 may alternatively be utilized with any other personal mobility devices and with any other wheels or other rotating components to generate an electrical current. As an example, in another embodiment, generator device 170 may be utilized with wheel 160 to generate an electrical current based on a rotation of wheel 160. For example, in another embodiment, housing 190 may be configured for attachment to steering column 124, e.g., in a similar manner to the attachment of housing 190 to support structure 142 or housing 290 to support structure 242, such that rotor 178 is biased into contact with wheel 160.

In some embodiments, each of wheels 160 and 162 may have a corresponding generator device 170, e.g., where the output electrical current may be combined or utilized separately to power a variety of load components 149 at various locations on personal mobility devices 100/200. For example, in one embodiment, a generator device 170 in engagement with wheel 160 may power load components 149 located at handlebar 110, stem 120, strut 132 of folding mechanism 130 and wheel 160 while a generator device 170 in engagement with wheel 162 may power load components 149 located at support structure 142, hinge 134 of folding mechanism 130 and wheel 162. In other embodiments, a generator device 170 in engagement with wheel 160 may power load components 149 located at any portion of personal mobility devices 100/200 while a generator device 170 in engagement with wheel 162 may power load components 149 located at any portion of personal mobility devices 100/200. In some embodiments, e.g., where additional wheels or other rotating components are present, each wheel or rotating component may optionally have a corresponding generator device 170 that is configured to power one or more load components 149 of personal mobility devices 100/200.

FIGS. 1 through 22 are conceptual illustrations allowing for an explanation of the disclosed embodiments of the invention. Notably, the figures and examples above are not meant to limit the scope of the invention to a single embodiment, as other embodiments are possible by way of interchange of some or all of the described or illustrated elements. Moreover, where certain elements of the disclosed embodiments can be partially or fully implemented using known components, only those portions of such known components that are necessary for an understanding of the disclosed embodiments are described, and detailed descriptions of other portions of such known components are omitted so as not to obscure the disclosed embodiments. In the present specification, an embodiment showing a singular component should not necessarily be limited to other embodiments including a plurality of the same component, and vice-versa, unless explicitly stated otherwise herein. Moreover, terms in the specification or claims are not intended to be ascribed an uncommon or special meaning unless explicitly set forth as such. Further, the disclosed embodiments encompass present and future known equivalents to the known components referred to herein by way of illustration.

The foregoing description will so fully reveal the general nature of the disclosed embodiments that others can, by applying knowledge within the skill of the relevant art(s) (including the contents of the documents cited and incorporated by reference herein), readily modify and/or adapt for various applications such specific embodiments, without undue experimentation, without departing from the general concept of the disclosed embodiments. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A personal mobility device comprising:
a wheel;
a support structure coupled to the wheel, the support structure comprising a housing defining a cavity therein;
a load component; and
a generator device coupled to the support structure, wherein the cavity comprises at least one channel and the generator device comprises at least one flange, the at least one channel being configured to slidingly receive the at least one flange of the generator device, the generator device being configured to frictionally engage against the wheel such that a rotation of the wheel causes the generator device to generate electrical energy, the personal mobility device being configured to power the load component based at least in part on the generated electrical energy.

2. The personal mobility device of claim 1 wherein:
the generator device comprises a rotor and a stator; and
the rotor is configured to frictionally engage against the wheel such that the rotation of the wheel causes the rotor to rotate about the stator, the stator being configured to generate the electrical energy based at least in part on the rotation of the rotor.

3. The personal mobility device of claim 1 wherein the load component comprises at least one lighting component.

4. The personal mobility device of claim 1 wherein the personal mobility device comprises an electrical storage component electrically interposed between the generator device and the load component, the electrical storage component being configured to supply electrical energy to the load component, the electrical storage component being configured to charge based at least in part on the electrical energy generated by the generator device.

5. The personal mobility device of claim 1 wherein the personal mobility device comprises voltage regulation circuitry disposed between the generator device and the load component, the voltage regulation circuitry being configured to regulate at least one of a voltage and a current of the electrical energy generated by the generator device.

6. The personal mobility device of claim 1 wherein the personal mobility device comprises an output connection that is configured to provide the electrical energy to an electrical device that is separate from the personal mobility device.

7. The personal mobility device of claim 6 wherein the output connection comprises at least one of a port, plug and a socket.

8. The personal mobility device of claim 6 wherein the output connection comprises a wireless power transmitter.

9. A personal mobility device comprising:
a wheel;
a support structure coupled to the wheel, the support structure comprising:
a housing, the housing defining a first cavity therein; and
a support member comprising a second cavity that is configured to receive the housing therein;
a load component; and
a generator device coupled to the support structure and biased against the wheel by a biasing component, wherein the first cavity is configured to slidingly receive the generator device therein such that the biasing component engages against the housing to bias the generator device towards the wheel, wherein the generator device is configured to frictionally engage against the wheel such that a rotation of the wheel causes the generator device to generate electrical energy, and wherein the personal mobility device is configured to power the load component based at least in part on the generated electrical energy.

10. The personal mobility device of claim 9 wherein the second cavity comprises at least one channel and the housing comprises at least one flange, the at least one channel being configured to receive the at least one flange of the housing therein when the housing is received in the second cavity.

11. The personal mobility device of claim 9 wherein:
the generator device comprises a rotor and a stator; and
the rotor is configured to frictionally engage against the wheel such that the rotation of the wheel causes the rotor to rotate about the stator, the stator being configured to generate the electrical energy based at least in part on the rotation of the rotor.

12. The personal mobility device of claim 9 wherein the load component comprises at least one lighting component.

13. The personal mobility device of claim 9 wherein the personal mobility device comprises an electrical storage component electrically interposed between the generator device and the load component, the electrical storage component being configured to supply electrical energy to the load component, the electrical storage component being configured to charge based at least in part on the electrical energy generated by the generator device.

14. The personal mobility device of claim 9 wherein the personal mobility device comprises voltage regulation circuitry disposed between the generator device and the load component, the voltage regulation circuitry being configured to regulate at least one of a voltage and a current of the electrical energy generated by the generator device.

15. The personal mobility device of claim 9 wherein the personal mobility device comprises an output connection that is configured to provide the electrical energy to an electrical device that is separate from the personal mobility device.

16. A personal mobility device comprising:

a wheel;

a support structure coupled to the wheel, the support structure comprising a support member and a housing, the housing defining a cavity therein;

a load component; and a generator device coupled to the support structure and biased against the wheel by a biasing component, wherein the cavity is configured to slidingly receive the generator device therein such that the biasing component engages against the housing to bias the generator device towards the wheel, wherein the cavity comprises at least one channel and the generator device comprises at least one flange, the at least one channel being configured to slidingly receive the at least one flange of the generator device therein when the generator device is received in the cavity, wherein the generator device is configured to frictionally engage against the wheel such that a rotation of the wheel causes the generator device to generate electrical energy, and wherein the personal mobility device is configured to power the load component based at least in part on the generated electrical energy.

17. The personal mobility device of claim 16 wherein the generator device is configured to linearly translate within the cavity along the at least one channel.

18. The personal mobility device of claim 16 wherein:

the generator device comprises a rotor and a stator; and the rotor is configured to frictionally engage against the wheel such that the rotation of the wheel causes the rotor to rotate about the stator, the stator being configured to generate the electrical energy based at least in part on the rotation of the rotor.

19. The personal mobility device of claim 16 wherein the load component comprises at least one lighting component.

20. The personal mobility device of claim 16 wherein the personal mobility device comprises an electrical storage component electrically interposed between the generator device and the load component, the electrical storage component being configured to supply electrical energy to the load component, the electrical storage component being configured to charge based at least in part on the electrical energy generated by the generator device.

21. The personal mobility device of claim 16 wherein the personal mobility device comprises voltage regulation circuitry disposed between the generator device and the load component, the voltage regulation circuitry being configured to regulate at least one of a voltage and a current of the electrical energy generated by the generator device.

22. The personal mobility device of claim 16 wherein the personal mobility device comprises an output connection that is configured to provide the electrical energy to an electrical device that is separate from the personal mobility device.

23. A personal mobility device comprising:

a first wheel;

a second wheel;

a support structure disposed between the first wheel and the second wheel, the support structure comprising a housing defining a cavity therein;

a load component; and a generator device coupled to the support structure, wherein the cavity comprises at least one channel and the generator device comprises at least one flange, the at least one channel being configured to slidingly receive the at least one flange of the generator device, the generator device being configured to frictionally engage against the second wheel such that a rotation of the second wheel causes the generator device to generate electrical energy, the personal mobility device being configured to power the load component based at least in part on the generated electrical energy.

24. The personal mobility device of claim 23 wherein:

the support structure comprises a support member and platform coupled to a top surface of the support member, the platform being configured for standing on by a user of the personal mobility device; and the generator device is coupled to the support member at least partially below the platform.

25. The personal mobility device of claim 24 wherein the generator device is coupled to an end of the support member and is disposed between the support member and the second wheel.

26. A scooter comprising:

a handlebar;

a stem;

a first wheel;

a second wheel;

a support structure coupled to the second wheel, the support structure comprising a housing defining a cavity therein;

a load component; and a generator device coupled to the support structure, wherein the cavity comprises at least one channel and the generator device comprises at least one flange, the at least one channel being configured to slidingly receive the at least one flange of the generator device, the generator device being configured to frictionally engage against the second wheel such that a rotation of the second wheel causes the generator device to generate electrical energy, the scooter being configured to power the load component based at least in part on the generated electrical energy.

27. The scooter of claim 26 wherein:

the generator device comprises a rotor and a stator; and the rotor is configured to frictionally engage against the second wheel such that the rotation of the second wheel causes the rotor to rotate about the stator, the stator being configured to generate the electrical energy based at least in part on the rotation of the rotor.

\* \* \* \* \*